US 8,825,696 B2

(12) United States Patent
Asai et al.

(10) Patent No.: US 8,825,696 B2
(45) Date of Patent: Sep. 2, 2014

(54) COMPUTER READABLE STORAGE MEDIUM RECORDING DATABASE SEARCH PROGRAM, DATABASE SEARCH DEVICE, AND DATABASE SEARCH METHOD

(75) Inventors: Tatsuya Asai, Kawasaki (JP); Shinichiro Tago, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/137,462

(22) Filed: Aug. 17, 2011

(65) Prior Publication Data

US 2011/0307511 A1 Dec. 15, 2011

Related U.S. Application Data

(63) Continuation of application No. PCT/JP2009/055522, filed on Mar. 19, 2009.

(51) Int. Cl.
*G06F 17/30* (2006.01)
(52) U.S. Cl.
CPC .............................. *G06F 17/30926* (2013.01)
USPC ........................................................ 707/769
(58) Field of Classification Search
CPC ................... G06Q 30/0244; G06F 17/30914; G06F 17/30557; G06F 17/30911
See application file for complete search history.

(56) References Cited

U.S. PATENT DOCUMENTS

| 6,848,078 B1* | 1/2005 | Birsan et al. ................... 715/206 |
| 7,937,399 B2* | 5/2011 | Furusho ......................... 707/758 |
| 2003/0018646 A1* | 1/2003 | Ohta et al. ...................... 707/100 |
| 2003/0028557 A1* | 2/2003 | Walker et al. .................. 707/500 |
| 2005/0262080 A1* | 11/2005 | Kolman et al. .................... 707/9 |
| 2007/0005598 A1* | 1/2007 | Okamoto et al. .................. 707/7 |
| 2007/0219959 A1* | 9/2007 | Kanemasa .......................... 707/3 |

FOREIGN PATENT DOCUMENTS

| JP | 3-174655 | 7/1991 |
| JP | 5-101053 | 4/1993 |
| JP | 5-101112 | 4/1993 |
| JP | 9-171510 | 6/1997 |
| JP | 2003-30227 | 1/2003 |
| JP | 2007-257083 | 10/2007 |

OTHER PUBLICATIONS

International Search Report for PCT/JP2009/055522, Mailed Apr. 15, 2009.

* cited by examiner

*Primary Examiner* — Yuk Ting Choi
(74) *Attorney, Agent, or Firm* — Staas & Halsey LLP

(57) ABSTRACT

In a search device according to the present invention, a path trie generation unit generates an input path trie from XML data, a path trie display unit outputs the input path trie to an output unit such as a display, so that a user can specify Join points and combining conditions. An instruction reception unit generates a query serving as a command statement to combine each piece of XML data based on the Join points and the combining conditions that are specified by the user.

12 Claims, 39 Drawing Sheets

FIG.1

EMPLOYEE DB.xml

```
<EMPLOYEE DB>
  <EMPLOYEE>
    <ID>12345</ID>
    <COMPANY NAME>FUJITSU LABORATORIES</COMPANY NAME>
    <NAME>ASAI</NAME>
    <ADDRESS>KAWASAKI CITY</ADDRESS>
  </EMPLOYEE>
  <EMPLOYEE>
    <ID>99999</ID>
    <COMPANY NAME>FUJITSU LABORATORIES</COMPANY NAME>
    <NAME>TAGO</NAME>
    <ADDRESS>SHINAGAWA WARD</ADDRESS>
  </EMPLOYEE>
</EMPLOYEE DB>
```

RESIDENT DB.xml

```
<RESIDENT DB>
  <RESIDENT>
    <NAME>ASAI</NAME>
    <COMPANY>FUJITSU LABORATORIES</COMPANY>
    <TEL>123-4567</TEL>
  </RESIDENT>
  <RESIDENT>
    <NAME>TAGO</NAME>
    <COMPANY>FUJITSU LABORATORIES</COMPANY>
    <TEL>888-8888</TEL>
    <TEL>999-9999</TEL>
  </RESIDENT>
</RESIDENT DB>
```

FIG.2

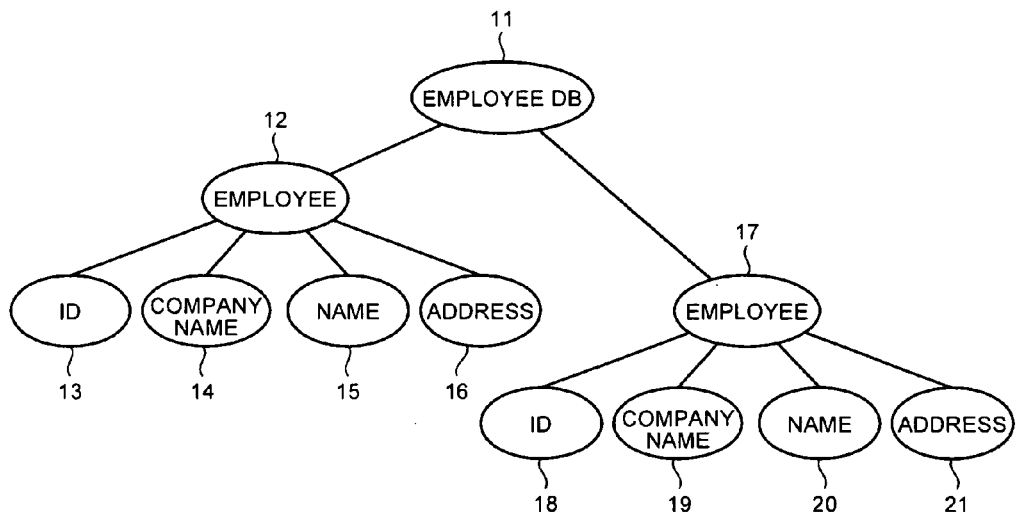

FIG.6

QUERY

```
For $a = document (EMPLOYEE DB.xml)/
EMPLOYEE DB/EMPLOYEE
For $b = document (RESIDENT DB.xml)/RESIDENT
DB/RESIDENT
Where $a/NAME = $b/NAME
Where $a/COMPANY NAME = $b/COMPANY
Return
<EMPLOYEE PHONEBOOK>
  <EMPLOYEE>
    {$a/NAME}
    {$a/ADDRESS}
    {$b/TEL}
  </EMPLOYEE>
</EMPLOYEE PHONEBOOK>
```

FIG.13

EMPLOYEE PHONEBOOK.xml
(COMBINATION CASE 1)

```
<EMPLOYEE PHONEBOOK>
 <EMPLOYEE>
  <NAME>ASAI</NAME>
  <ADDRESS>KAWASAKI CITY</ADDRESS>
  <TEL>123-4567</TEL>
 </EMPLOYEE>
 <EMPLOYEE>
  <NAME>TAGO</NAME>
  <ADDRESS>SHINAGAWA WARD</ADDRESS>
  <TEL>888-8888</TEL>
  <TEL>999-9999</TEL>
 </EMPLOYEE>
</EMPLOYEE PHONEBOOK>
```

EMPLOYEE PHONEBOOK.xml
(COMBINATION CASE 2)

```
<EMPLOYEE PHONEBOOK>
 <EMPLOYEE>
  <NAME>ASAI</NAME>
  <ADDRESS>KAWASAKI CITY</ADDRESS>
  <TEL>123-4567</TEL>
 </EMPLOYEE>
 <EMPLOYEE>
  <NAME>TAGO</NAME>
  <ADDRESS>SHINAGAWA WARD</ADDRESS>
  <TEL>888-8888</TEL>
 </EMPLOYEE>
 <EMPLOYEE>
  <NAME>TAGO</NAME>
  <ADDRESS>SHINAGAWA WARD</ADDRESS>
  <TEL>999-9999</TEL>
 </EMPLOYEE>
</EMPLOYEE PHONEBOOK>
```

FIG.14

```
For $a = document (EMPLOYEE
DB.xml)/EMPLOYEE DB/EMPLOYEE
For $b = document (RESIDENT
DB.xml)/RESIDENT DB/RESIDENT
Where $a/NAME = $b/NAME
Where $a/COMPANY NAME = $b/
COMPANY
Return
<EMPLOYEE PHONEBOOK>
   <EMPLOYEE>
   {$a/NAME}
   {$a/COMPANY NAME}
   {$b/TEL}
   </EMPLOYEE>
</EMPLOYEE PHONEBOOK>
```

```
For $a = document (EMPLOYEE
DB.xml)/EMPLOYEE DB/EMPLOYEE
For $b = document (RESIDENT
DB.xml)/RESIDENT DB/RESIDENT/TEL
Where $a/NAME = $b/../NAME
Where $a/COMPANY NAME = $b/../
COMPANY
Return
<EMPLOYEE PHONEBOOK>
   <EMPLOYEE>
   {$a/NAME}
   {$a/COMPANY NAME}
   {$b}
   </EMPLOYEE>
</EMPLOYEE PHONEBOOK>
```

| EMPLOYEE DB | RESIDENT DB | CONDITION |
|---|---|---|
| COMPANY NAME(EMPLOYEE DB/ EMPLOYEE/COMPANY NAME) | COMPANY(RESIDENT DB/ RESIDENT/COMPANY) | FULL COINCIDENCE |
| NAME(EMPLOYEE DB/EMPLOYEE/NAME) | NAME(RESIDENT DB/RESIDENT/ NAME) | FULL COINCIDENCE |

| DATA TYPE | PATH NAME |
|---|---|
| EMPLOYEE DB | /EMPLOYEE DB/EMPLOYEE |
| RESIDENT DB | /RESIDENT DB/RESIDENT/TEL |

140f

```
For $a = document (EMPLOYEE DB.xml)/
EMPLOYEE DB/EMPLOYEE
For $b = document (RESIDENT DB.xml)/RESIDENT DB/
RESIDENT/TEL
Where $a/NAME = $b/../NAME
Where $a/COMPANY NAME = $b/../COMPANY
Return
<EMPLOYEE PHONEBOOK>
  <EMPLOYEE>
  {$a/NAME}
  {$a/COMPANY NAME}
  {$b}
  </EMPLOYEE>
</EMPLOYEE PHONEBOOK>
```

COMPUTER READABLE STORAGE MEDIUM RECORDING DATABASE SEARCH PROGRAM, DATABASE SEARCH DEVICE, AND DATABASE SEARCH METHOD

CROSS-REFERENCE TO RELATED APPLICATION

This application is a continuation of International Application No. PCT/JP2009/055522, filed on Mar. 19, 2009, the entire contents of which are incorporated herein by reference.

FIELD

The embodiment discussed herein is directed to, for example, a database search device utilizing semi-structured data.

BACKGROUND

In recent years, markup languages, such as XML (Extensible Markup Language), have been used as document data processed by a computer. The XML can make it easy to share a structured document and structured data between different information systems through the Internet particularly, and thus has been increasingly used by computers (e. g., refer to Japanese Laid-open Patent Publication No. 05-101053). Hierarchically structured document data described based on the XML is hereinafter described as XML data.

As for techniques related to the XML data, a technique is known in which even if an author freely edits a document without any editorial constraint, the past document can be restored (e.g., refer to Japanese Laid-open Patent Publication No. 09-171510).

Conventionally, new XML data may be produced by taking specific data from a plurality of pieces of XML data and combining them for utilizing existing XML data. In combining the data, a user oneself needs to input a complicated query (Xquery) into a computer, so that a problem arises in that it is a heavy burden for the user to use the query.

SUMMARY

According to an aspect of an embodiment of the invention, a non-transitory computer-readable storage medium stores therein a program causing a computer to execute a process generating a plurality of pieces of first aggregate structure data each aggregating relationships among elements of a tree structure data by aggregating a plurality of child elements to a single child element when the tree structure data includes the plurality of child elements that have a same name and are directly associated with a same parent element; receiving second aggregate structure data corresponding to combined data generated by combining parts of each piece of the tree structure data, a combining condition for each element of the tree structure data to be combined, and one of the elements of the first aggregate structure data as a specified element; determining one of the elements of the first aggregate structure data as a reference element based on the second aggregate structure data corresponding to the combined data and the combining condition; and comparing a first data amount of combined data generated based on the reference element as a data handling unit of the tree structure data with a second data amount of combined data generated based on the specified element as a data handling unit of the tree structure data, and outputting a comparison result.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a schematic illustrating an example of a data structure of XML data;

FIG. 2 is a schematic illustrating a tree structure of "employee DB. xml";

FIG. 6 is a schematic illustrating an exemplary query that a user inputs to a computer;

FIG. 13 is a schematic illustrating an example of a plurality of pieces of combined data generated from a path trie of the combined data illustrated in FIG. 10;

FIG. 14 is a schematic illustrating exemplary queries of combination cases 1 and 2;

FIG. 23 is a schematic illustrating an example of a data structure of a combining condition specification table;

FIG. 24 is a schematic illustrating an example of a data structure of a Join point specification table;

DESCRIPTION OF EMBODIMENT

Preferred embodiments of the present invention will be explained with reference to accompanying drawings.

Embodiment

First, XML (Extensible Markup Language) data used in the present embodiment is described. FIG. 1 is a schematic illustrating an example of a data structure of the XML data. As illustrated in FIG. 1, the XML data has a hierarchical structure in which elements are partitioned by element identifiers "<" and "</". In the following descriptions, the XML data illustrated on the left side of FIG. 1 is represented as "employee DB. xml" while the XML data illustrated on the right side of FIG. 1 is represented as "resident DB. xml". Each of the XML data illustrated in FIG. 1 can be represented as a tree structure.

Figure 3:
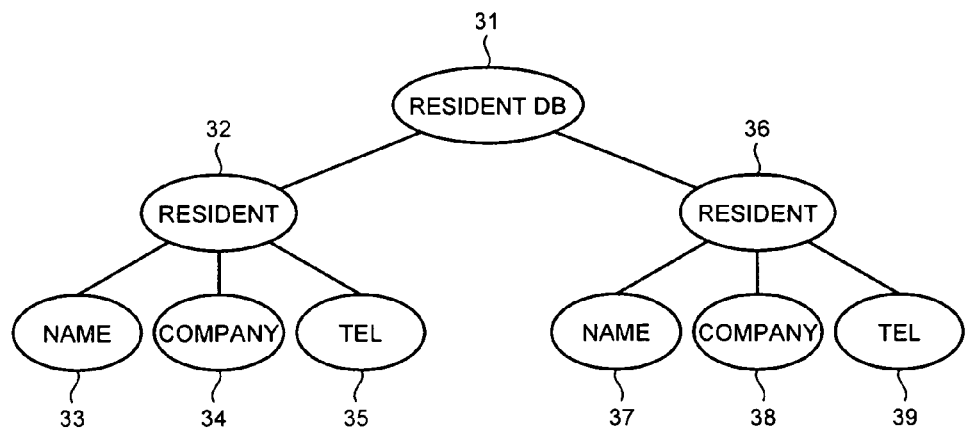
FIG. 3 is a schematic illustrating a tree structure of "resident DB. xml"

FIG. 2 is a schematic illustrating a tree structure of the "employee DB. xml" while FIG. 3 is a schematic illustrating a tree structure of the "resident DB. xml". As illustrated in FIG. 2, in the tree structure of the "employee DB. xml", the XML data includes elements nodes having node IDs 11 to 21 and the elements nodes are connected to each other. Likewise, in the tree structure of the "resident DB. xml", the XML data includes elements nodes having node IDs 31 to 39 and the elements nodes are connected to each other. There is a case in which text data may be included in the tree structure of XML data. However, the description of the case is omitted herein. In semi-structured data represented by the XML data as described above, the relationship among items or among items and values can be expressed as a tree structure.

Figure 4:
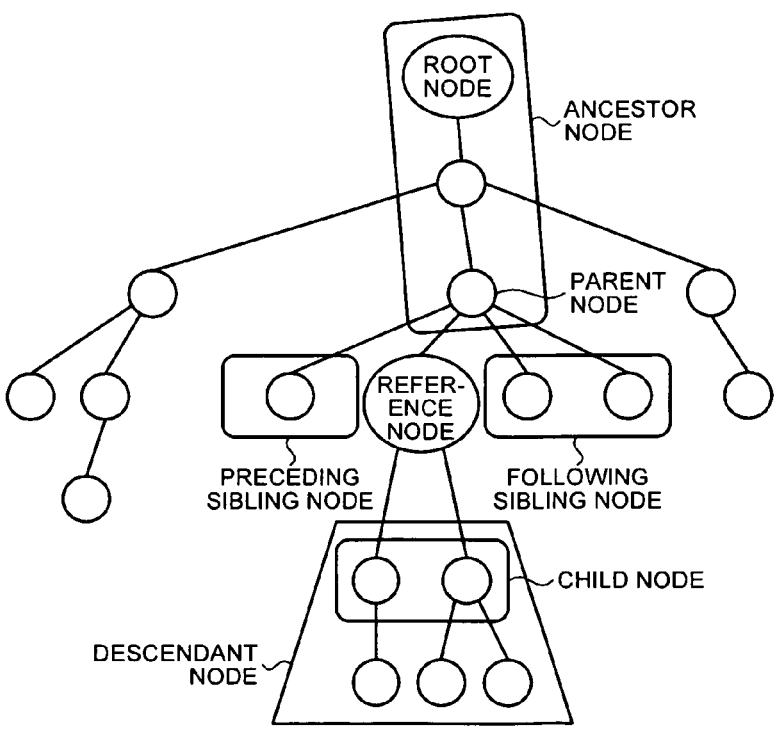
FIG. 4 is a schematic for supplementary explanation on tree node terms.

When nodes included in the tree structures illustrated in FIGS. 2 and 3 are explained, terms such as a root node, a parent node, a child node, a preceding sibling node, a following sibling node, an ancestor node, and a descendant node may be used. FIG. 4 is a schematic for supplementary explanation on these tree node terms. As illustrated in FIG. 4, a node that is one of the nodes forming the tree and located in the top layer is defined as the root node. A node located in a layer immediately above a reference node and connected to the reference node is defined as the parent node of the reference node (hereinafter, simply referred to as the parent node). A node located in a layer immediately below the reference node and connected to the reference node is defined as the child node of the reference node (hereinafter, simply referred to as the child node).

A node located in the same layer as the reference node, connected to the same parent node as the reference node is connected, and present on the left side of the reference node is defined as the preceding sibling node of the reference node (hereinafter, simply referred to as the preceding sibling node). A node located in the same layer as the reference node, connected to the same parent node as the reference node is connected, and present on the right side of the reference node is defined as the following sibling node of the reference node (hereinafter, simply referred to as the following sibling node). Nodes present in a path from the root node to the parent node are collectively defined as the ancestor nodes. Nodes connected under the reference node are collectively defined as the descendant nodes.

Figure 5:
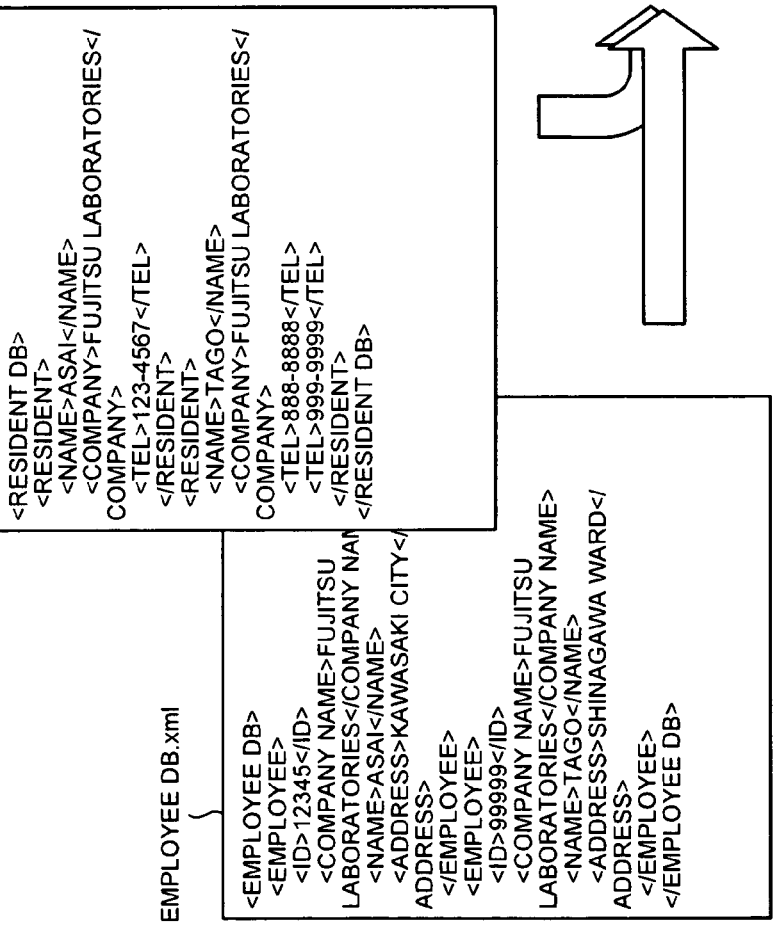
FIG. 5 is a schematic for explaining a conventional manner to combine XML data.

A conventional manner for combining XML data is described below. FIG. 5 is a schematic for explaining a conventional manner for combining XML data. An example illustrated in FIG. 5 is a case in which a TEL item of a certain person in the "resident DB. xml" is added to an employee item of the same person in the "employee DB. xml" so as to newly produce "employee phonebook. xml".

The same person in FIG. 5 represents a person having the same name item and company item in the "employee DB. xml" and the "resident DB. xml". For example, the sets of Asai and Fujitsu Laboratories, and Tago and Fujitsu Laboratories are the same as those of the employee items in the "employee DB. xml" and the "resident DB. xml". That is, Asai in the "employee DB. xml" and Asai in the "resident DB.

xml" represent the same person while Tago in the "employee DB. xml" and Tago in the "resident DB. xml" represent the same person.

When the "employee phonebook. xml" is produced by combining data of the "employee DB. xml" and the "resident DB. xml" as illustrated in FIG. 5, a user oneself needs to input a query as illustrated in FIG. 6 to a computer. FIG. 6 is a schematic illustrating an exemplary query that a user inputs to a computer.

In FIG. 6, the statement starting with "For" is called as a For statement. The For statement is a command statement that specifies items of XML data to be processed. For example, the statement of "For $a=document (employee DB. xml)/employee DB/employee" specifies the employee item of the "employee DB. xml". The statement "For $b=document (resident DB. xml)/resident DB/resident" specifies a resident item of the "resident DB. xml".

In FIG. 6, the statement starting with "Where" is called as a Where statement. The Where statement is a command statement that specifies various conditions for data combination. In the following explanation, a condition for data combination is represented as a combining condition. For example, when the statements of "Where $a/name/=$b/name" and "Where $a/company name/=$b/company" are stated, the statements specify the combining condition that, in the items specified by the For statement (the employee item and the resident item), a tag name of a name of data A (e.g., "employee DB. xml") and a tag name of a name of data B (e.g., "resident DB. xml") coincide with each other, and a tag name of a company name of the data A and a tag name of a company of the data B coincide with each other.

In FIG. 6, the statement starting with "Return" is called as a Return statement. The return statement is a command statement that specifies a format of data after data combination. In a format specified by the Return statement, only items satisfying the condition of the Where statements are registered from the items specified by the For statements.

For example, a user states the following Return statement when the data after data combination is output as the format of the "employee phonebook. xml" illustrated in FIG. 5.

```
<employee phonebook>
  <employee>
  {$a/name}
  {$a/address}
  {$b/TEL}
  </employee>
<employee phonebook>
```

However, because a query such as one illustrated in FIG. 6 is complicated, it is a heavy burden for a user to specify a query and combine XML data by the user oneself. If data combination of XML data can be performed in an intuitive manner without making a query such as one illustrated in FIG. 6, the burden of a user can be reduced.

An outline of a search device according to the embodiment is described below. The search device according to the embodiment realizes data combination in an intuitive manner without a user directly inputting a query (e.g., refer to FIG. 6). FIGS. 7 to 12 are schematics illustrating exemplary user interface in data combination realized by the search device according to the embodiment. An example when the "employee phonebook. xml" is produced from the "employee DB. xml" and the "resident DB. xml" is described herein.

First, the search device aggregates the hierarchical structures of the existing XML data of the "employee DB. xml" and the "resident DB. xml" to make path tries and displays the path tries on a display. The path trie of the "employee DB. xml" is illustrated on the upper left side in FIG. 7 while the path trie of the "resident DB. xml" is illustrated on the upper right side in FIG. 7. In the lower area in FIG. 7, a user constructs a path trie of combined data that a user wants to produce by using an input device (keyboard, mouse, and the like).

Figure 8:
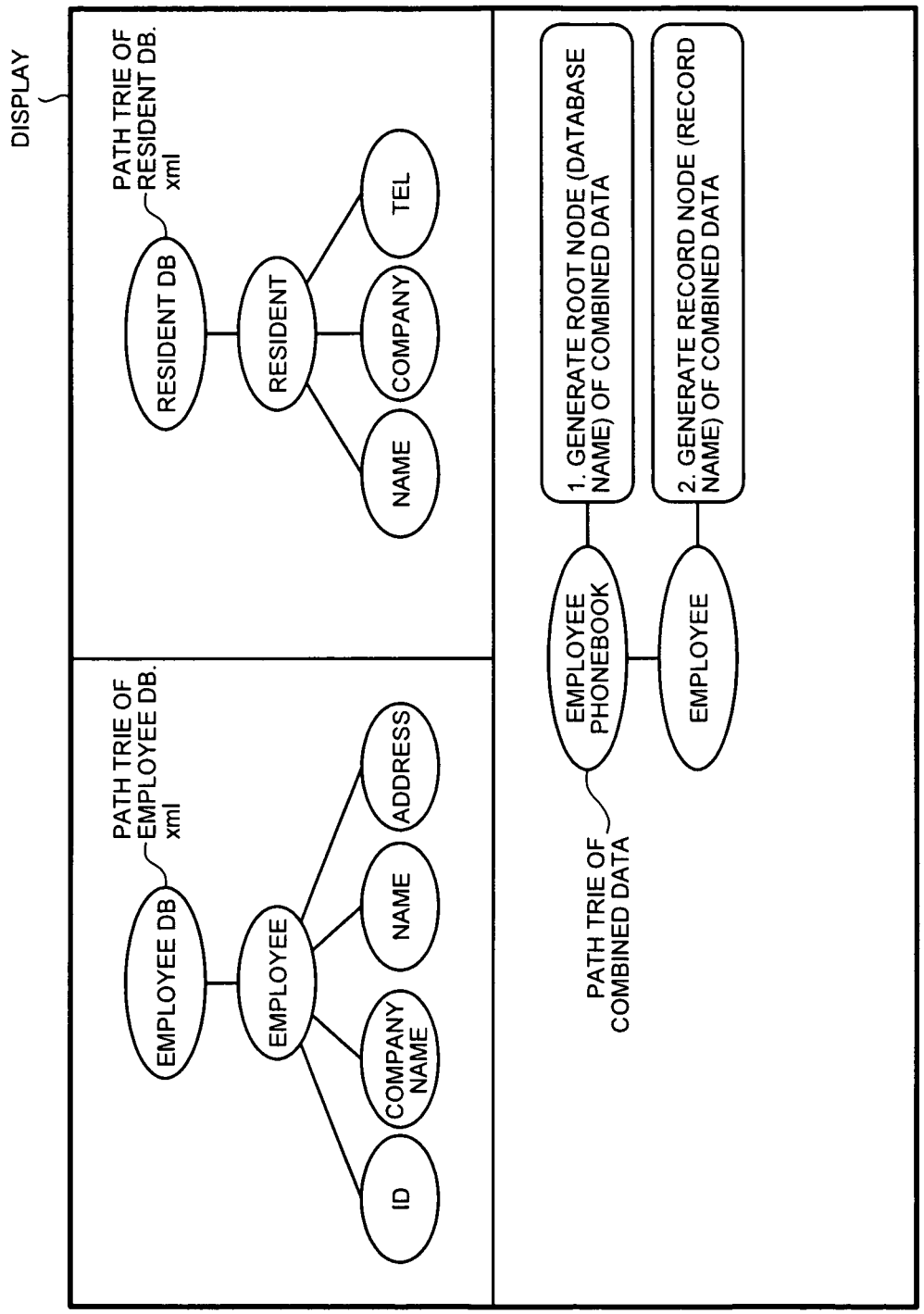
FIG. 8 is diagram (2) illustrating exemplary user interface in data combination realized by the search device according to the present embodiment.
Figure 9:
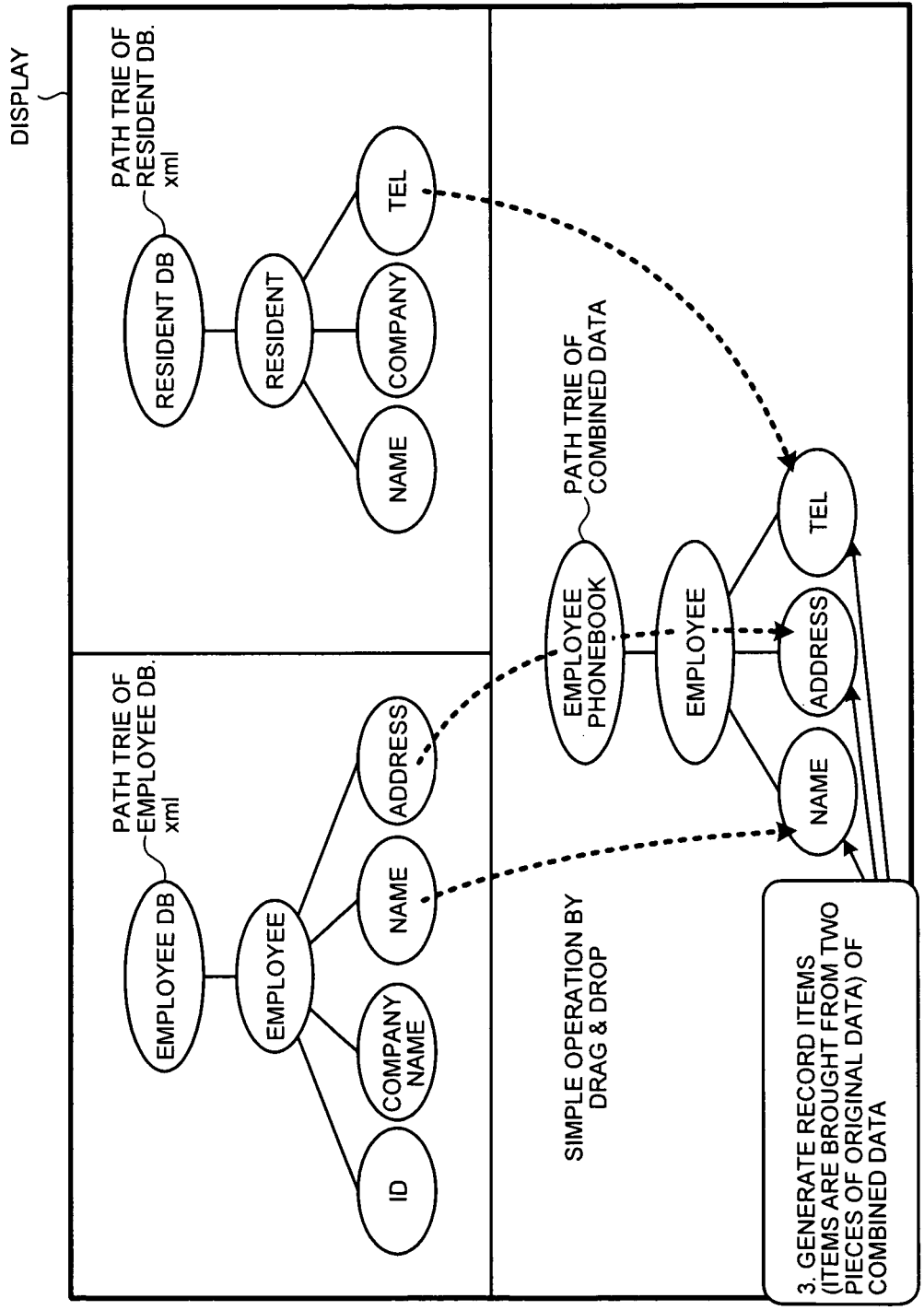
FIG. 9 is diagram (3) illustrating exemplary user interface in data combination realized by the search device according to the present embodiment.

For example, as illustrated in FIG. 8, a user uses the input device to produce a root node of combined data (employee phonebook) and a record node of the combined data. The user, then, adds a record item to the path trie of the combined data by simple operation of drag and drop using the input device as illustrated in FIG. 9. In the example illustrated in FIG. 9, the "name" node and the "address" node of the path trie of the "employee DB. xml" are connected to the employee node while the "TEL" node of the path trie of the "resident DB. xml" is connected to the employee node.

The user specifies a combining condition by using the input device. For example, when a combining condition that tag names of the "name" nodes of the path tries coincide with each other is specified, the "name" node of the path trie of the "employee DB. xml" and the "name" node of the "resident DB. xml" are colored the same color. When a combining condition that the tag names of the "company name" node of the path trie of the "employee DB. xml" and the "company" node of the "resident DB. xml" coincide with each other, the "company name" node and the "company" are colored the same color (refer to FIG. 10).

Figure 10:
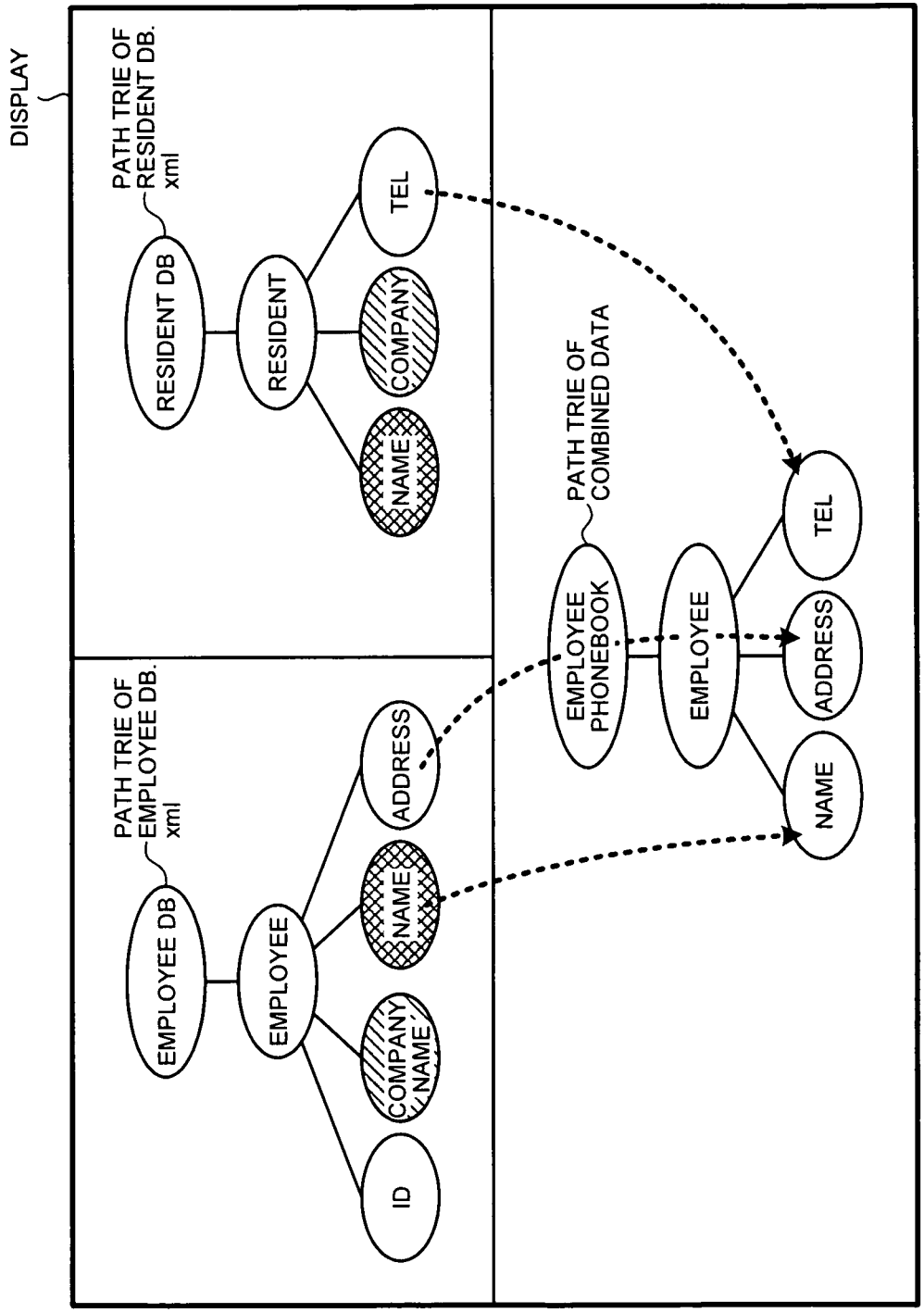
FIG. 10 is diagram (4) illustrating exemplary user interface in data combination realized by the search device according to the present embodiment.

When the search device generates combined data based on the path trie of the combined data specified in FIG. 10, the combined data is conceivable in two ways as illustrated in FIG. 13. FIG. 13 is a schematic illustrating an example of a plurality of pieces of combined data generated from the path trie of the combined data illustrated in FIG. 10.

In a combination case 1 illustrated on the left side in FIG. 13, even when a person has a plurality of telephone numbers (TELs), the combined data of the person is generated with the plurality of telephone numbers because the combined data is generated on a resident-by-resident basis. On the other hand, in a combination case 2, data is generated every telephone number when a person has a plurality of telephone numbers because the combined data is generated on a TEL-by-TEL basis.

When the combination cases 1 and 2 are compared, a data amount of the combined data in the combination case 1 can be reduced to be lower than that of the combined data in the combination case 2 because the telephone numbers are collectively described in the combined data. Accordingly, it is preferable to generate combined data such as one in the combination case 1 rather than one in the combination case 2 when combined data is generated.

FIG. 14 is a schematic illustrating exemplary queries of the combination cases 1 and 2. The query for generating the "employee phonebook. xml (the combination case 1)" is illustrated on the left side in FIG. 14 while the query for generating the "employee phonebook. xml (the combination case 2)" is illustrated on the right side in FIG. 14.

Referring to the left side in FIG. 14, because the query has the For statement of the "For $b=document (resident DB. xml)/resident DB/resident", it is specified that the "resident DB. xml" is processed on a resident-by-resident basis when combined data is generated. Referring to the right side in FIG. 14, because the query has the For statement of the "For $b=document (resident DB. xml)/resident DB/resident/TEL", it is specified that the "resident DB. xml" is processed on a TEL-by-TEL basis when combined data is generated.

The search device can determine a unit based on which combined data is generated from the queries illustrated in FIG. 14. The search device, however, does not determine a unit based on which combined data is generated from the user interface illustrated in FIG. 10 alone. Therefore, the search device according to the embodiment further introduces a concept of a Join point. The Join point is defined as a node of a path trie that corresponds to a path expression specifying a "data handling unit".

A user operates the input device so as to specify one of the nodes on the path trie as the Join point to be set as a data handling unit in each of the "employee DB. xml" and the "resident DB. xml".

Figure 11:
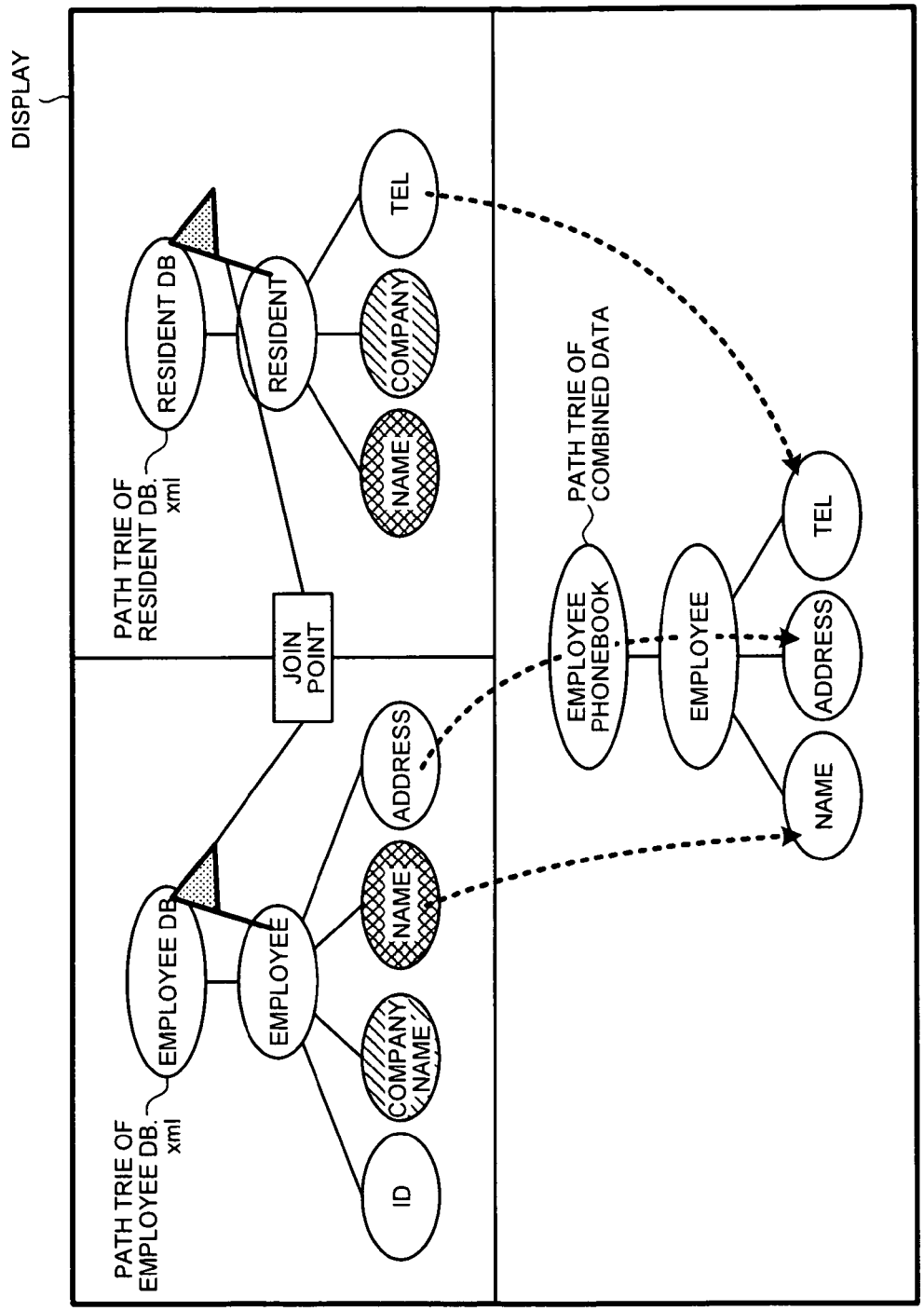
FIG. 11 is diagram (5) illustrating exemplary user interface in data combination realized by the search device according to the present embodiment.
Figure 12:
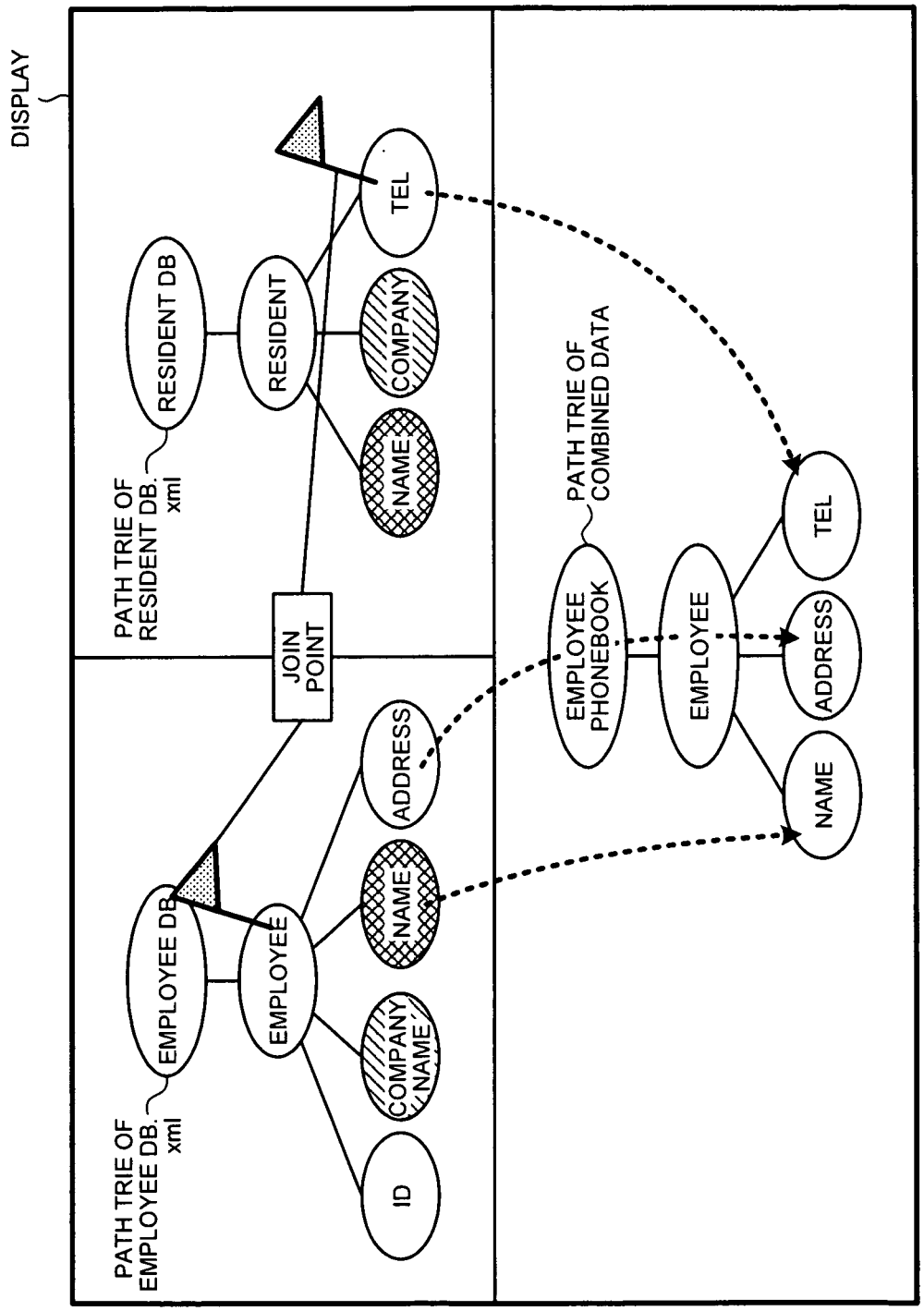
FIG. 12 is diagram (6) illustrating exemplary user interface in data combination realized by the search device according to the present embodiment.

For example, when the "employee phonebook. xml (the combination case 1)" illustrated on the left side in FIG. 13 is generated by processing the "employee DB. xml" on an employee-by-employee basis, and the "resident DB. xml" on a resident-by-resident basis, the employee node of the "employee DB. xml" and the resident node of the "resident DB. xml" may be specified as the Join points as illustrated in FIG. 11. When the "employee phonebook. xml (the combination case 2)" illustrated on the right side in FIG. 13 is generated by processing the "employee DB. xml" on an employee-by-employee basis, and the "resident DB. xml" on a TEL-by-TEL basis, the employee node of the "employee DB. xml" and the TEL node of the "resident DB. xml" may be specified as the Join points as illustrated in FIG. 12.

When specifying join points, a user does not determine to what extent a data amount of combined data increases. The data amount may increase depending on Join points specified by a user. Such a case needs to be avoided. The search device according to the embodiment automatically determines reference Join points in addition to the Join points specified by a user, and notifies the user of to what extent the combined data increases based on the Join points specified by the user and the reference Join points.

In this manner, the search device according to the embodiment causes a user to construct combined data by utilizing path tries, so that the user can easily design combined data without learning difficult query syntax. The search device according to the embodiment can eliminate ambiguity of data combination on path tries by causing a user to specify Join points. The search device according to the embodiment automatically determines reference Join points in addition to the Join points specified by a user, and notifies the user of to what extent the combined data increases based on the Join points specified by the user and the reference Join points. This notification makes it possible to alert a user when a data amount of the combined data will increase.

Figure 15:
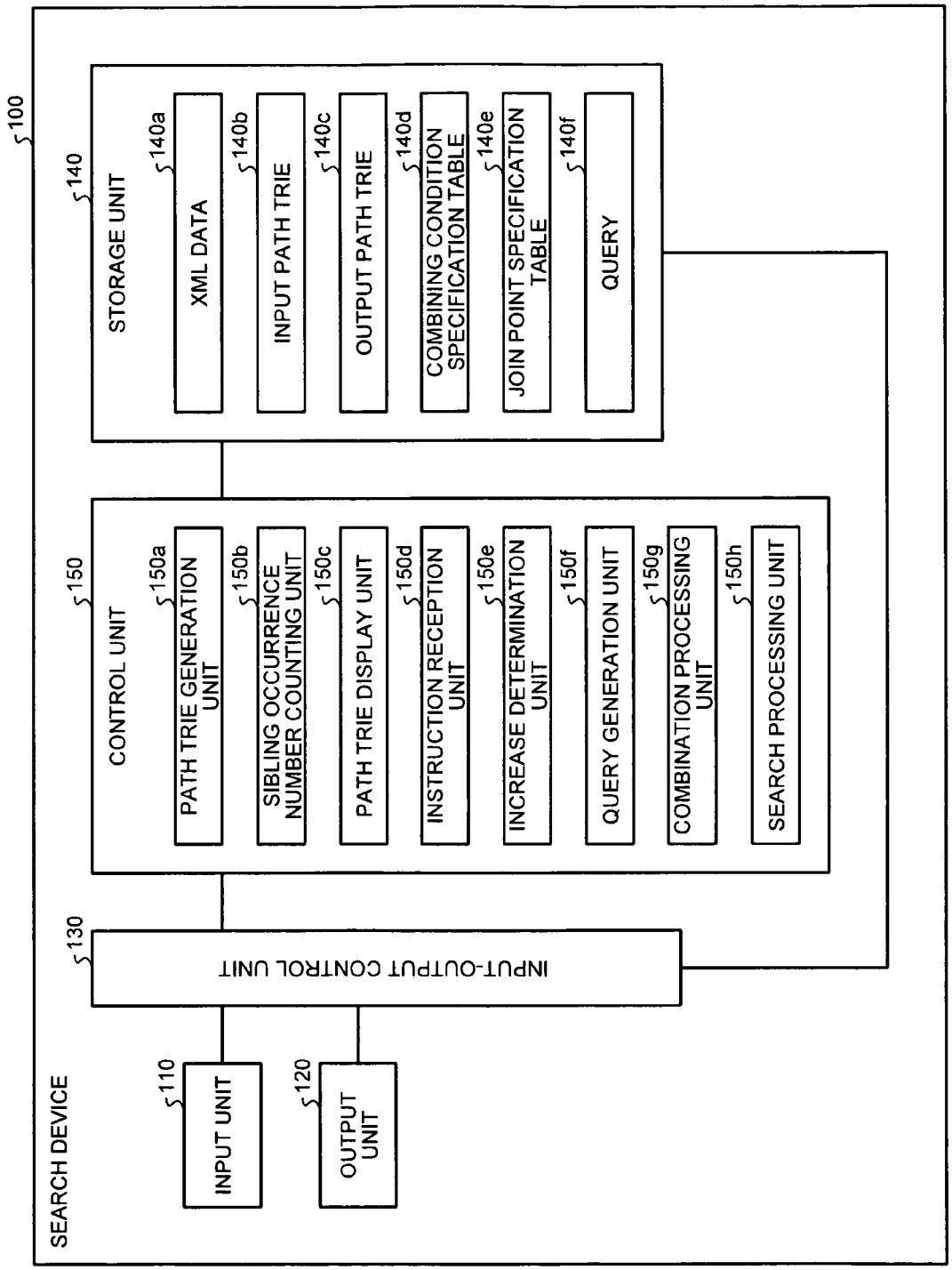
FIG. 15 is a schematic illustrating a structure of the search device according to the present embodiment.

A structure of the search device according to the embodiment is described below. FIG. 15 is a schematic illustrating a structure of a search device 100 according to the embodiment. As illustrated in FIG. 15, the search device 100 includes an input unit 110, an output unit 120, an input-output control unit 130, a storage unit 140, and a control unit 150.

The input unit 110 receives information to specify a path trie of combined data and Join points. The input unit 110 may be a keyboard and a mouse. The output unit 120 outputs various information, such as the query, the XML data, the path trie, and the search result. The output unit 120 may be a monitor (or a display, or a touch panel). The input-output control unit 130 controls input and output of data by the input unit 110, the output unit 120, the storage unit 140, and the control unit 150.

The storage unit 140 stores data and programs, need for various processing performed by the control unit 150. The storage unit 140 includes XML data 140a, an input path trie 140b, an output path trie 140c, a combining condition specification table 140d, a Join point specification table 140e, and a query 140f.

The XML data 140a is document data having a hierarchical structure in which elements are partitioned by element identifiers "<", "</" and the like as described above (refer to FIG. 1). The data structure of the XML data 140a is not limited to that illustrated in FIG. 1, and may also be expressed in the tree structures described with reference to FIGS. 2 and 3, for example.

Figure 16:
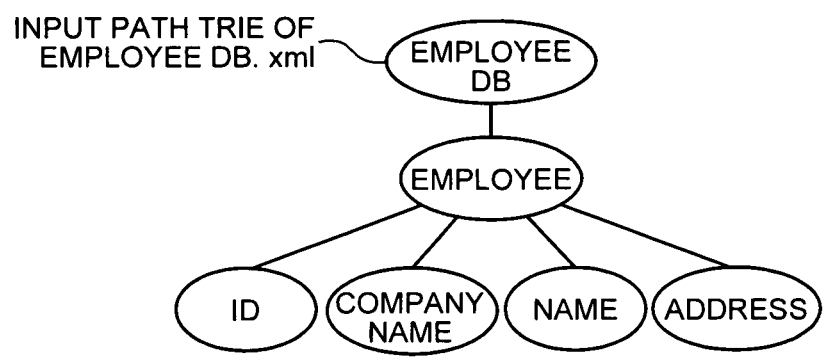
FIG. 16 is a schematic illustrating an input path trie corresponding to the "employee DB. xml"

The input path trie 140b is data (path trie) aggregating the XML data 140a. Specifically, the input path trie corresponding to the "employee DB. xml" is represented by the input path trie illustrated in FIG. 16 while the input path trie corresponding to the "resident DB. xml" is represented by the input path trie illustrated in FIG. 17. FIG. 16 is a schematic illustrating the input path trie corresponding to the "employee DB. xml" while FIG. 17 is a schematic illustrating the path trie corresponding to the "resident DB. xml".

Figure 18:
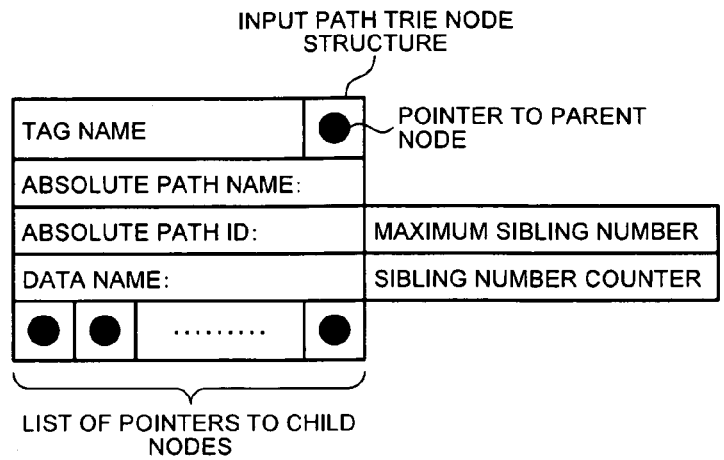
FIG. 18 is a schematic illustrating an example of a data structure of an input path trie node structure.

The input path trie 140b connects a plurality of input path trie node structures with one another. FIG. 18 is a schematic illustrating an example of the data structure of an input path trie node structure. As illustrated in FIG. 18, the input path trie node structure includes a tag name, an absolute path name, an absolute path ID, a data name, a maximum sibling number, a sibling number counter, a pointer to the parent node, and a list of pointers to the child nodes.

Figure 17:
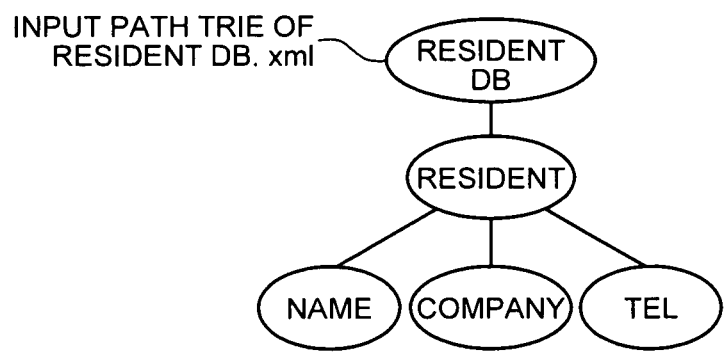
FIG. 17 is a schematic illustrating a input path trie corresponding to the "resident DB. xml"

For example, in the case of an input path trie node structure corresponding to "resident" node of the input path trie of the "resident DB. xml" illustrated in FIG. 17, the tag name is "resident", the absolute path name is "/resident DB/resident", the absolute path ID is "2", and the data name is "resident DB. xml". The pointer to the parent node is connected to the input path trie node structure having a tag name "resident DB". The pointers to the child nodes are connected to the tag names "name", "company", and "TEL", respectively.

The maximum sibling number corresponding to the tag name "resident" is "2" because the maximum sibling number of resident in the resident DB. xml is "2" (refer to FIG. 3). The sibling number counter is described later.

Figure 19:
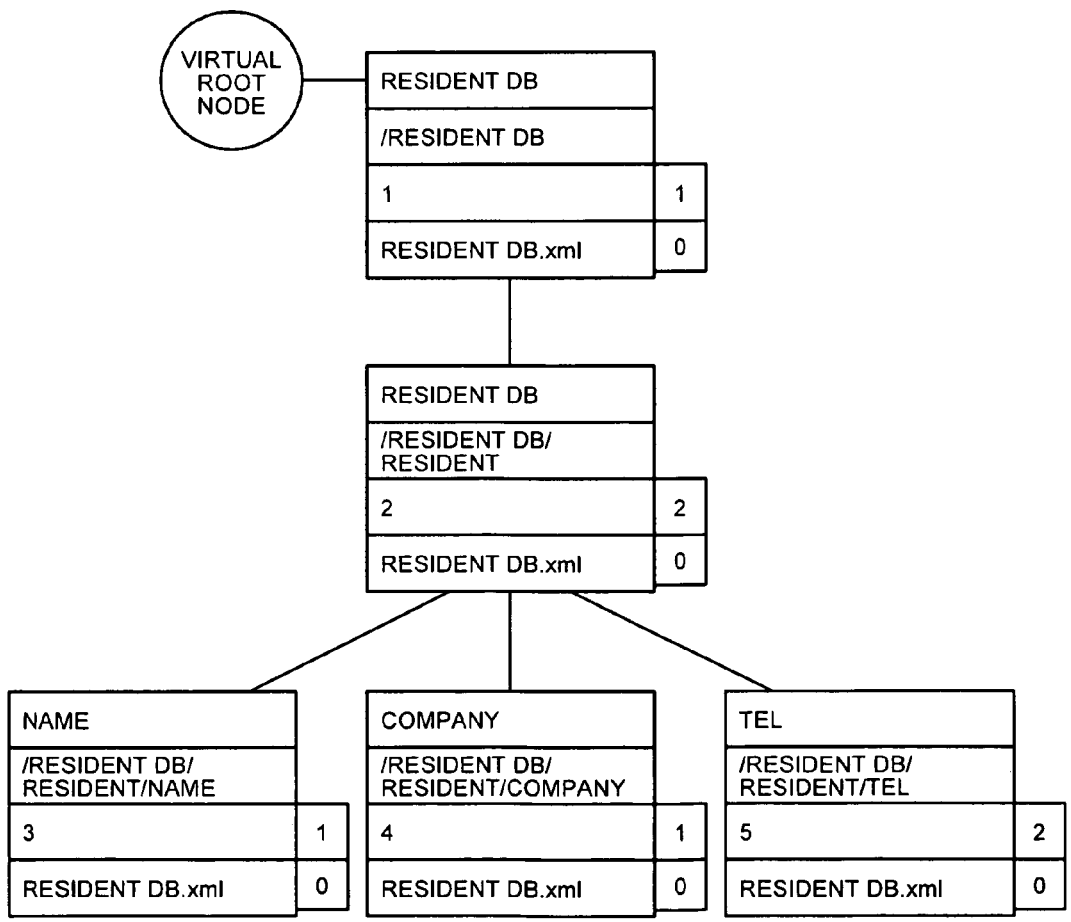
FIG. 19 is a schematic illustrating the input path trie of the "resident DB. xml" in input path trie node structures.
Figure 20:
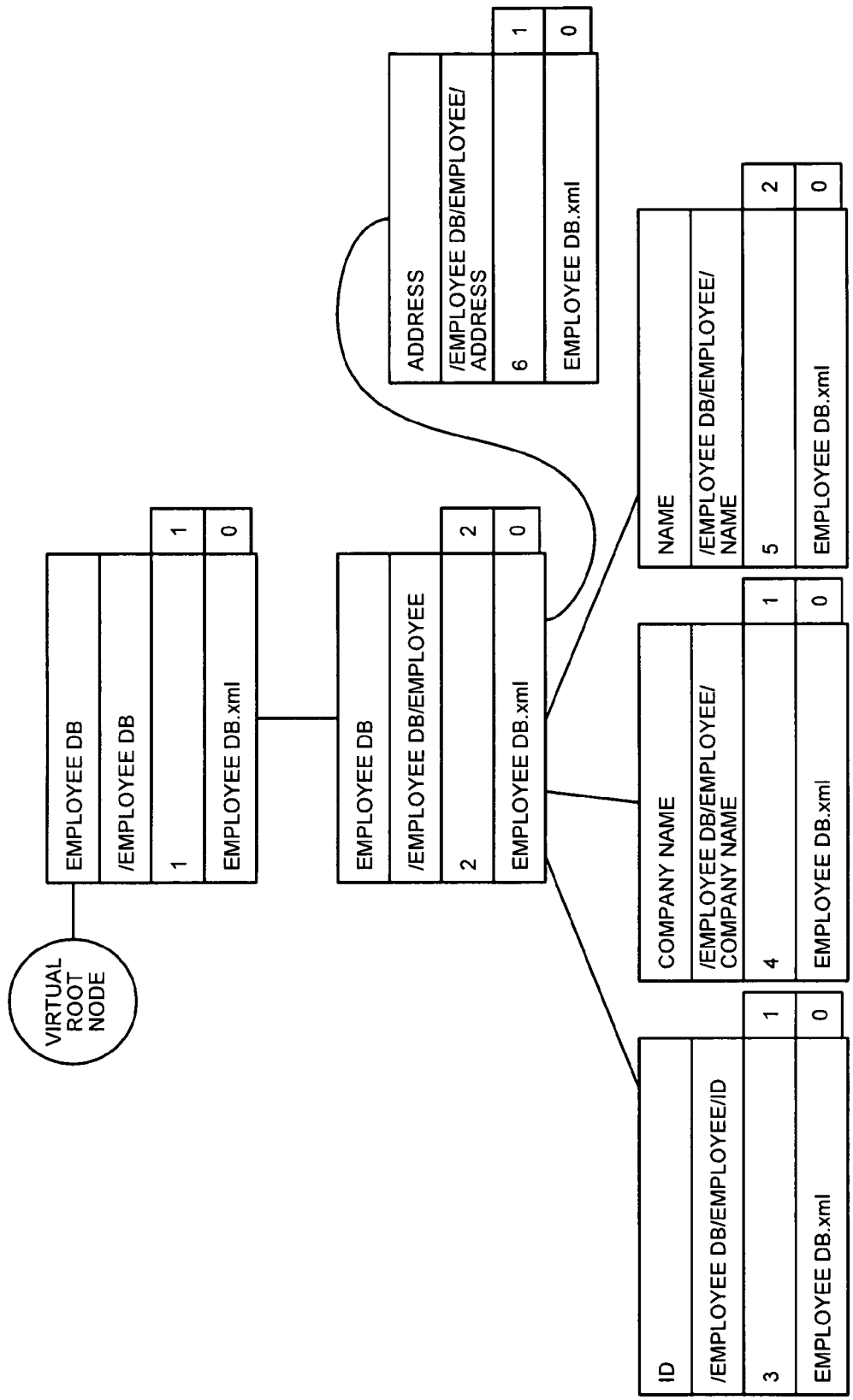
FIG. 20 is a schematic illustrating the input path trie of the "employee DB. xml" in input path trie node structures.

The input path trie of the "resident DB. xml" is expressed in a plurality of input path trie node structures as illustrated in FIG. 19. FIG. 19 illustrates the input path trie of the "resident DB. xml" in the input path trie node structures. The input path trie of the "employee DB. xml" is expressed in a plurality of input path trie node structures as illustrated in FIG. 20. FIG. 20 illustrates the input path trie of the "employee DB. xml" in the input path trie node structures. The input path trie 140b illustrated in FIG. 15 includes the input path trie of the "employee DB. xml" and the input path trie of the "resident DB. xml".

Figure 21:
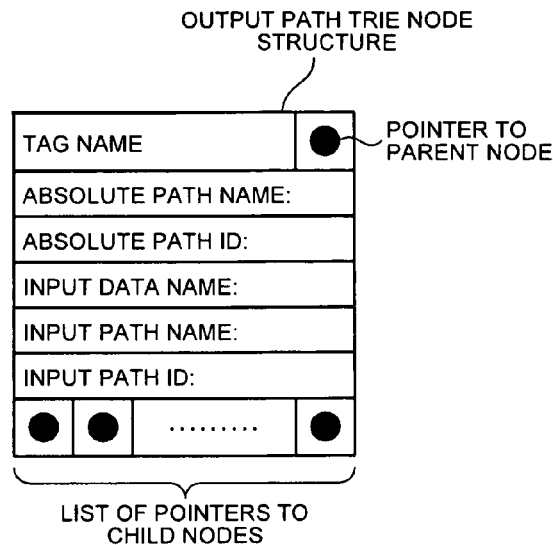
FIG. 21 is a schematic illustrating an example of a data structure of an output path trie node structure.

The output path trie 140c is data (path trie) aggregating combined data. A user specifies the output path trie 140c through the input unit 110 (e.g., refer to the lower area in FIG. 12). The output path trie connects a plurality of output path trie node structures with one another. FIG. 21 is a schematic illustrating an example of the data structure of an output path trie node structure.

As illustrated in FIG. 21, the output path trie node structure includes a tag name, an absolute path name, an absolute path ID, an input data name, an input path name, an input path ID, a pointer to the parent node, and a list of pointers to the child nodes. A name of data including a certain node is registered in the input data name. A node ID of the certain node included in the data is registered in the input path name. A path ID of the data including the certain node is registered in the input path ID. When the certain node is newly generated by a user, "New" is registered to each of the input data name, the input path name, and the input path ID.

For example, in the case of the output path trie node structure corresponding to the "name" node of the path trie of combined data illustrated in the lower area of FIG. 12, the tag name is "name" and the absolute path name is "employee phonebook/employee/name". In the output path trie node structure corresponding to the "name" node, the input data name is "employee DB. xml", the input path name is "employee DB/employee/name" because the name node is moved from the path tire of the "employee DB. xml" (refer to FIG. 20), and the input path ID is "5".

In the case of the output path trie node structure corresponding to the "TEL" node of the path trie of combined data illustrated in the lower area of FIG. 12, the tag name is "TEL" and the absolute path name is "employee phonebook/employee/address". In the output path trie node structure corresponding to TEL node, the input data name is "resident DB. xml", and the input path name is "resident DB/resident/TEL" because the TEL node is moved from the path trie of the "resident DB. xml" (refer to FIG. 19), and the input path ID is "5".

In the case of the output path trie node structure corresponding to the "employee" node of the path trie of combined data illustrated in the lower area of FIG. 12, the tag name is "employee", the absolute path name is "employee phonebook/employee", and the absolute path ID is "2". Because the employee node is newly generated, "New" is registered to each of the input data name, the input path name, and the input path ID of the output path trie node structure of the employee node as described with reference to FIG. 8, for example.

Figure 22:
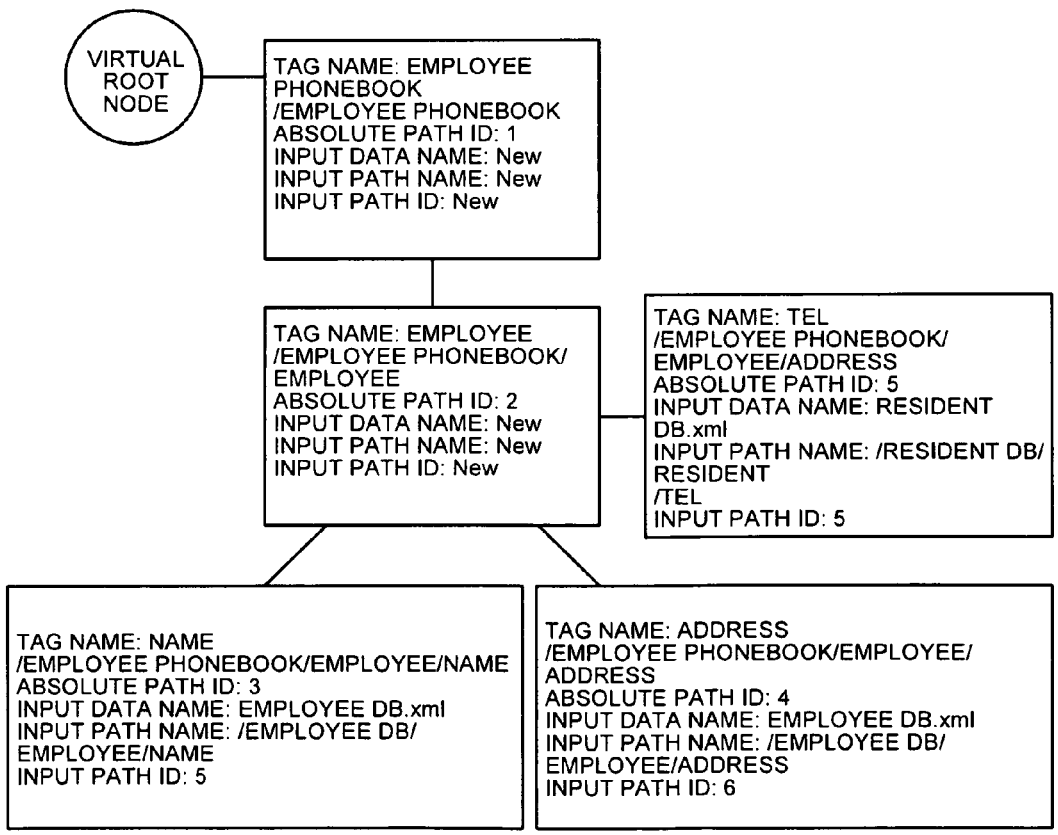
FIG. 22 is a schematic illustrating the output path trie of the "employee phonebook DB. xml" in output path trie node structures.

The output path trie of combined data (e.g., employee phonebook. xml) is expressed in a plurality of output path trie node structures as illustrated in FIG. 22. FIG. 22 illustrates the output path trie of the "employee phonebook DB. xml" in the output path trie node structures.

Referring back to the explanation of FIG. 15, the combining condition specification table 140d controls combining conditions. FIG. 23 is a schematic illustrating an example of the data structure of the combining condition specification table 140d. A condition that the tag name of the "company name" node of the "employee DB. xml" and the tag name of the "company" node of the "resident DB. xml" fully coincide with each other is specified in the first row of FIG. 23. A condition that the tag name of the "name" node of the "employee DB. xml" and the tag name of the "name" node of the "resident DB. xml" fully coincide with each other is specified in the second row of FIG. 23.

The Join point specification table 140e controls Join points. FIG. 24 is a schematic illustrating an example of the data structure of the Join point specification table 140e. As illustrated in FIG. 24, the Join point specification table 140e stores a data type and a path name so as to correspond to each other.

The first row of FIG. 24 illustrates that the employee node (path name:/employee DB/employee) is specified as a Join point in the path trie of the employee DB. xml (refer to the upper left side in FIG. 12). The second row of FIG. 24 illustrates that the TEL node (path name:/resident DB/resident/TEL) is specified as a Join point in the path trie of the resident DB. xml (refer to the upper right side in FIG. 12).

The query 140f is automatically generated by the control unit 150 based on the output path trie 140c, the combining condition specification table 140d, the Join point specification table 140e, for example. The data structure of the query 140f is exemplarily illustrated in FIG. 13.

The control unit 150 includes an internal memory for storing programs specifying various processing procedures and control data, and performs various processing based on the programs and the data. As illustrated in FIG. 15, the control unit 150 includes a path trie generation unit 150a, a sibling occurrence number counting unit 150b, a path trie display unit 150c, and an instruction reception unit 150d. The control unit 150 includes an increase determination unit 150e, a query generation unit 150f, a combination processing unit 150g, and a search processing unit 150h.

The path trie generation unit 150a aggregates the XML data 140a (refer to FIGS. 1 to 3) and generates the input path trie 140b (FIGS. 16 and 17). Processing performed by the path trie generation unit 150a is specifically described. The path trie generation unit 150a first determines, for each of the element nodes present in the tree-structured data of the XML data 140a, whether there is a plurality of child nodes that have the same tag name and are directly associated with (connected to) parent nodes having the same tag name.

If there is a plurality of child nodes having the same tag name and directly associated with parent nodes having the same tag name, the path trie generation unit 150a aggregates the overlapping parent nodes having the same tag name into one parent node, and aggregates the overlapping child nodes having the same tag name into one child node, thereby generating the input path trie 140b.

For example, in the "employee DB. xml" illustrated in FIG. 2, there is a plurality of child nodes "employee" having the same tag name and directly associated with the parent node "employee DB" having the same tag name. Therefore, the path trie generation unit 150a aggregates employee 12 and employee 17 into one employee, and generates the input path trie illustrated in FIG. 16. The path trie generation unit 150a aggregates descendant nodes of employee 12 and employee 17 such that nodes having the same tag name are not overlapped.

In the "resident DB. xml" illustrated in FIG. 3, there is a plurality of child nodes "resident" having the same tag name and directly associated with the parent node "resident DB" having the same tag name. Therefore, the path trie generation unit 150a aggregates resident 32 and resident 36 into one resident, and generates the input path trie illustrated in FIG. 17. The path trie generation unit 150a aggregates descendant nodes of resident 32 and resident 36 such that nodes having the same tag name are not overlapped.

At the point when the path trie generation unit 150a generates the input path trie 140b from the XML data 140a, the maximum sibling number and the sibling number counter included in the input path trie node structure of the input path trie 140b have a Null value.

The sibling occurrence number counting unit 150b determines, based on the element nodes included in the input path trie 140b and the XML data 140a, the number of siblings of the respective element nodes of the XML data corresponding to the respective elements nodes of the input path trie 140b.

Description is specifically made with reference to FIGS. 2 and 3. In the employee DB. xml illustrated in FIG. 2, the "employee DB" node is the root node, and thus has no sibling. Therefore, the sibling occurrence number counting unit 150b sets 1 as the maximum sibling number of the tag name "employee DB" of the input path trie node structure.

When determining the number of siblings of the "employee" node in the employee DB. xml illustrated in FIG. 2, because there are two "employee" nodes directly connected to the same parent node "employee DB", the sibling occurrence number counting unit 150b sets 2 as the maximum sibling number of the tag name "employee" of the input path trie node structure.

When determining the number of siblings of the "ID", "company name", "name", and "address" nodes in the employee DB. xml illustrated in FIG. 2, because they have no siblings, the sibling occurrence number counting unit 150b sets 1 as the maximum sibling number of the tag names "ID", "company name", "name", and "address" of the input path trie node structure.

Figure 7:
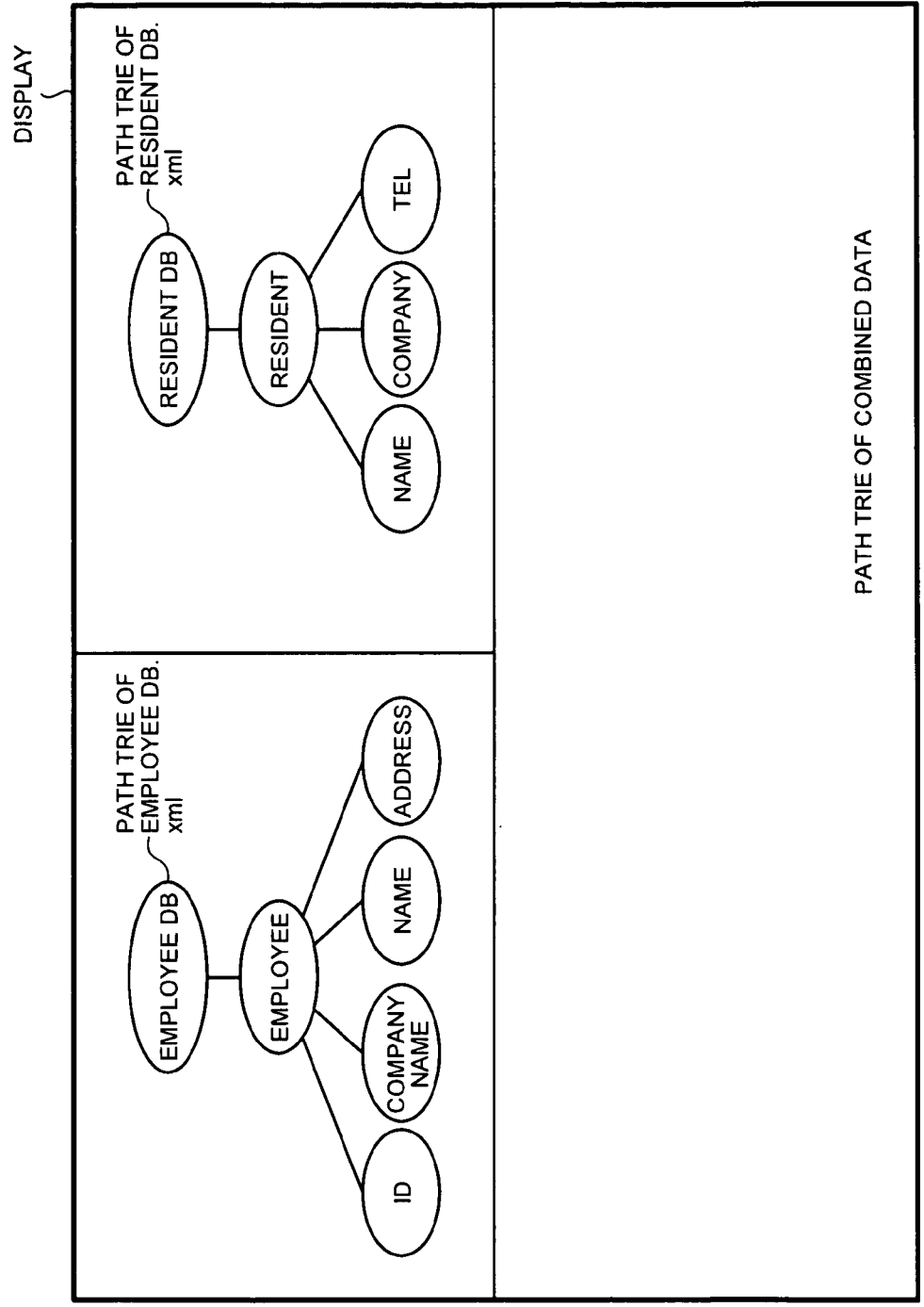
FIG. 7 is diagram (1) illustrating exemplary user interface in data combination realized by a search device according to the present embodiment.

The path trie display unit 150c reads the input path trie 140b of the storage unit 140, and displays a path trie of each piece of XML data on the output unit 120. For example, the path trie display unit 150c displays the path trie of the "employee DB. xml" and the path trie of the "resident DB. xml" on a display as illustrated in FIG. 7.

The instruction reception unit 150d receives an instruction from a user operating the input unit 110, and generates an output path trie of combined data. The instruction reception unit 150d receives the Join points and the combining condition from a user operating the input unit 110. Processing performed by the instruction reception unit 150d is specifically described below. The following description is made based on an example in which the instruction reception unit 150d receives instructions from a user according to the procedures of FIGS. 7 to 12.

Figure 25:
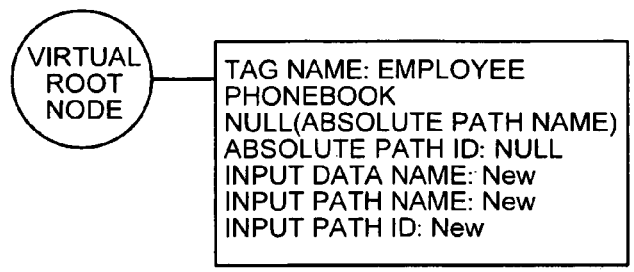
FIG. 25 is diagram (1) for explaining processing by an instruction reception unit.

FIGS. 25 to 30 are schematics to explain processing performed by the instruction reception unit 150d. As illustrated in FIG. 25, when receiving a request for newly generating the root node "employee phonebook" from a user, the instruction reception unit 150d newly generates an output path trie node structure, registers "employee phonebook" as the tag name of the generated output path trie node structure, and sets NULL as each of the absolute path name and the absolute path ID. The output path trie node structure is newly generated as described above. Therefore, the instruction reception unit 150d sets New as the input data name, the input path name, and the input path ID of the "employee phonebook" node.

Figure 26:
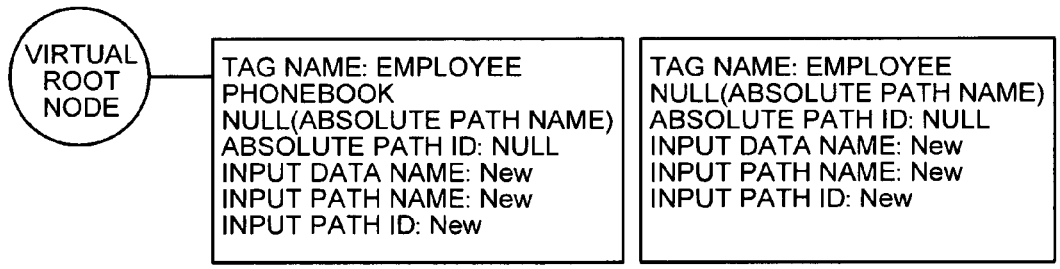
FIG. 26 is diagram (2) for explaining processing by the instruction reception unit.

As illustrated in FIG. 26, when receiving a request for newly generating the "employee" node from a user, the instruction reception unit 150d newly generates an output path trie node structure, registers "employee" as the tag name of the generated output path trie node structure, and sets Null as each of the absolute path name and the absolute path ID. The output path trie node structure is newly generated as described above. Therefore, the instruction reception unit 150d sets New as each of the input data name, the input path name, and the input path ID of the "employee" node.

Figure 27:
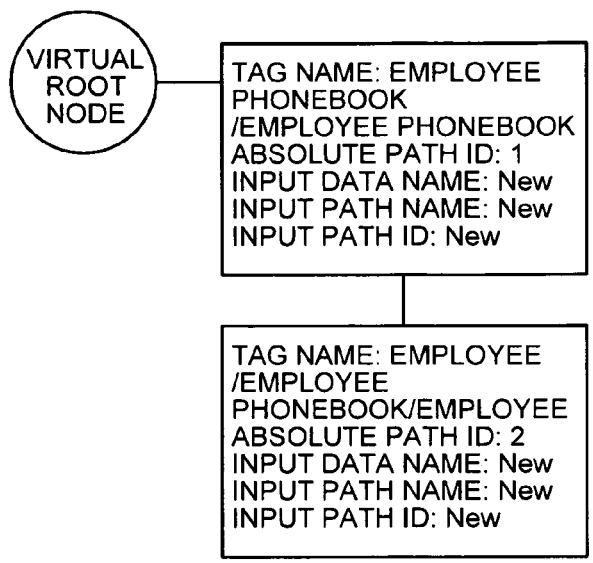
FIG. 27 is diagram (3) for explaining processing by the instruction reception unit.

A case is described below in which a user operates the input unit 110 to specify "employee phonebook" as the parent node and "employee" as the child node, and the employee phonebook node and the employee node are connected. As illustrated in FIG. 27, the instruction reception unit 150d sets the child pointer of the employee phonebook node to the employee node, and the parent pointer of the employee node to the employee phonebook node, thereby connecting the employee phonebook node and the employee node.

Because the employee phonebook node is the root node, the instruction reception unit 150d sets "/employee phonebook" as the absolute path of the employee phonebook node, and sets "1" as the absolute path ID. When setting the absolute path ID of the employee node, the instruction reception unit 150d determines the absolute path name by sequentially adding tag names from the root node to the employee node. Because the resulting absolute path name of the employee node is "/employee phonebook/employee", the instruction reception unit 150d registers "/employee DB/employee" as the absolute path name of the employee node. The instruction reception unit 150d sets "2" as the absolute path ID of the employee node.

Figure 28:
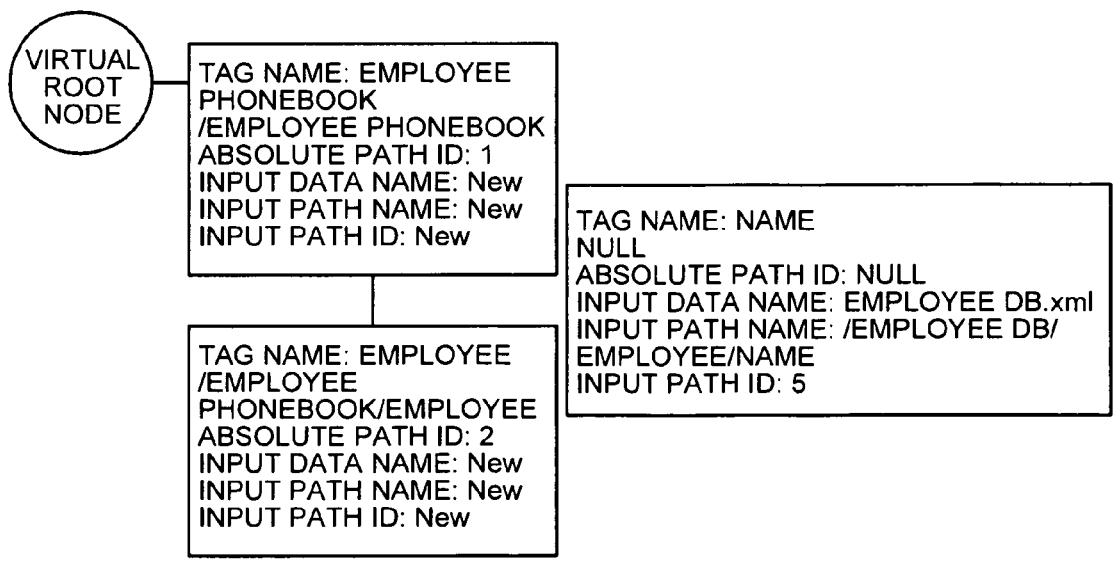
FIG. 28 is diagram (4) for explaining processing by the instruction reception unit.

A case is described below in which a user operates the input unit 110 to drag the "name" node from the input path trie of the "employee DB. xml" and drop the node on the output path trie of the combined data, and the name node is connected to the employee node of the output path trie of the combined data. As illustrated in FIG. 28, the instruction reception unit 150d newly generates an output path trie node structure, and sets "name" as the tag name of the generated output path trie node structure. The instruction reception unit 150d sets Null as the absolute path ID.

The name node is dragged from the input path trie of the "employee DB. xml" and dropped as described above. The instruction reception unit 150d, thus, acquires the absolute path name of the "name" node on the input path trie of the "employee DB. xml" as the input path name, and acquires the absolute path ID of the name node as the input path ID with reference to the input path trie 140b.

As illustrated in FIG. 20, on the input path trie of the "employee DB. xml", the absolute path name of the "name" node is "/employee DB/employee/name", and the absolute path ID of the "name" node is "5". As illustrated in FIG. 28, the instruction reception unit 150d thus sets "employee DB. xml" as the input data name, "/employee DB/employee/name" as the input path name, and "5" as the input path ID of the name node.

Figure 29:
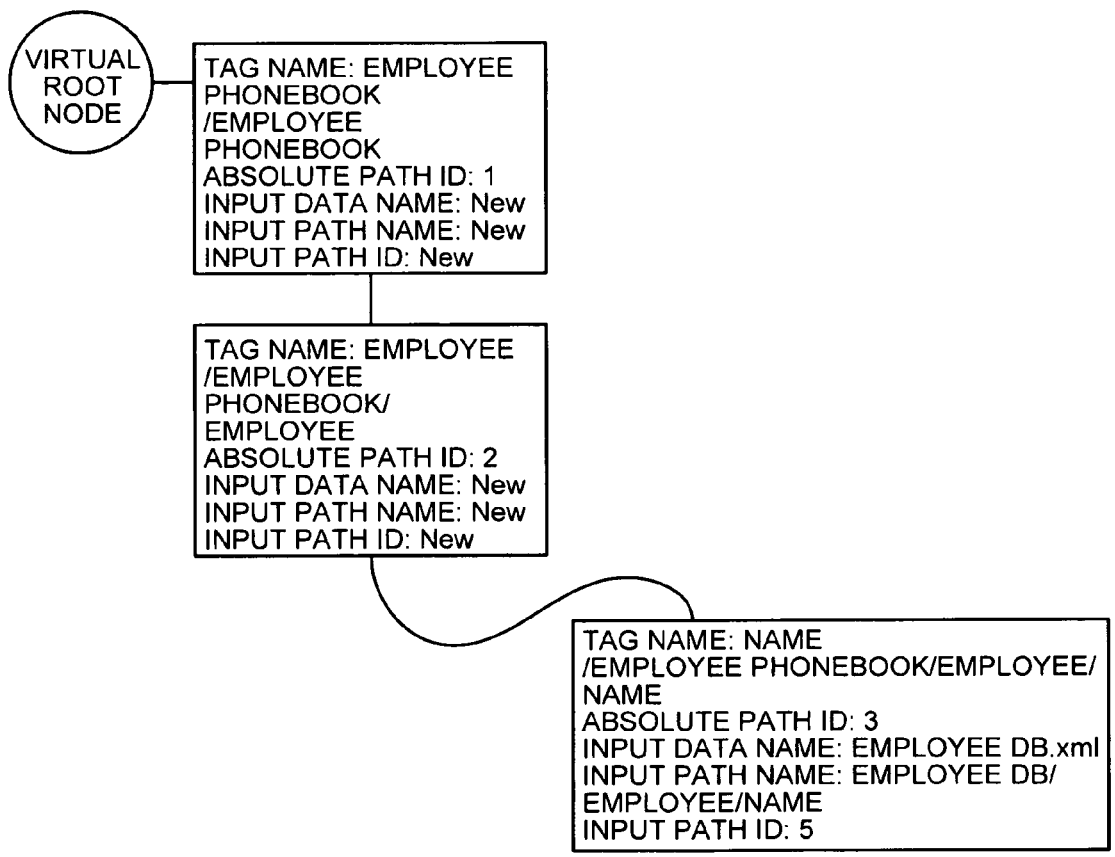
FIG. 29 is diagram (5) for explaining processing by the instruction reception unit.

As illustrated in FIG. 29, the instruction reception unit 150d sets the child pointer of the employee node to the name node and sets the parent pointer of the name node to the employee node, thereby connecting the employee node and the name node.

Figure 30:
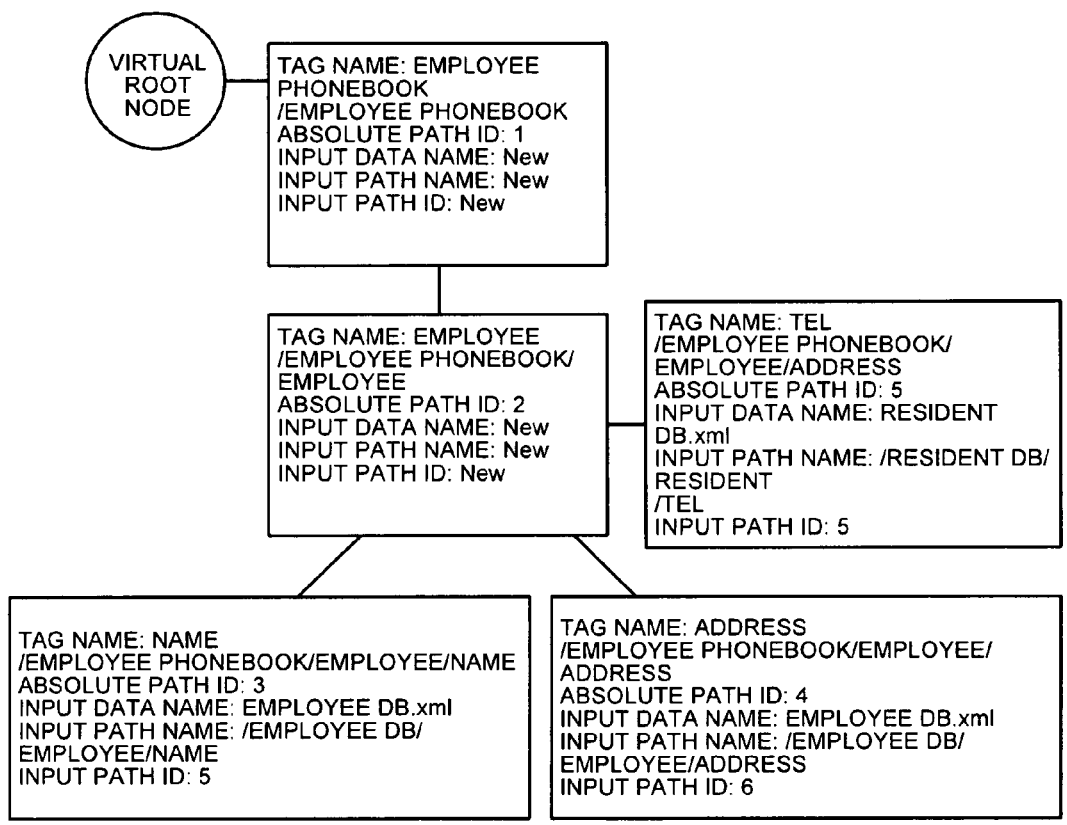
FIG. 30 is diagram (6) for explaining processing by the instruction reception unit.

A case is described below in which a user operates the input unit 110 to drag the "address" node from the input path trie of the "employee DB. xml" and drop the node on the output path trie of the combined data, and the address node is connected to the employee node of the output path trie of the combined data. As illustrated in FIG. 30, the instruction reception unit 150d newly generates an output path trie node structure, and sets "address" as the tag name of the generated output path trie node structure. The instruction reception unit 150d sets 4 as the absolute path ID.

The address node is dragged from the input path trie of the "employee DB. xml" and dropped as described above. The instruction reception unit 150d, thus, acquires the absolute path name of the "address" node on the input path trie of the "employee DB. xml" as the input path name and acquires the absolute path ID of the address node as the input path ID with reference to the input path trie 140b.

As illustrated in FIG. 20, on the input path trie of the "employee DB. xml", the absolute path name of the "address" node is "/employee DB/employee/address", and the absolute path ID of the address node is "6". As illustrated in FIG. 30, the instruction reception unit 150d sets "employee DB. xml" as the input data name, "/employee DB/employee/address" as the input path name, and "6" as the input path ID of the address node.

A case is described below in which a user operates the input unit 110 to drag the "TEL" node from the input path trie of the "resident DB. xml" and drop the node on the output path trie of the combined data, and the TEL node is connected to the employee node of the output path trie of the combined data. As illustrated in FIG. 30, the instruction reception unit 150d newly generates an output path trie node structure, and sets "TEL" as the tag name of the generated output path trie node structure. The instruction reception unit 150d sets "5" as the absolute path ID of the TEL node.

The TEL node is dragged from the input path trie of the "resident DB. xml" and dropped as described above. The instruction reception unit 150*d*, thus, acquires the absolute path name of the "TEL" node on the input path trie of the "resident DB. xml" as the input path name, and acquires the absolute path ID of the TEL node as the input path ID with reference to the input path trie 140*b*.

As illustrated in FIG. 19, on the input path trie of the "resident DB. xml", the absolute path name of the "TEL" node is "/resident DB/resident/TEL", and the absolute path ID of the "TEL" node is "5". As illustrated in FIG. 30, the instruction reception unit 150*d* sets "resident DB. xml" as the input data name, "/resident DB/resident/TEL" as the input path name, and "5" as the input path ID of the TEL node.

As described above, the instruction reception unit 150*d* generates the output path trie 140*c* of combined data by executing processing illustrated in FIGS. 25 to 30.

Processing is described below when the instruction reception unit 150*d* receives a combining condition from a user as illustrated in FIG. 10. For example, the instruction reception unit 150*d* receives the combining condition that "company name" and "company" fully coincide with each other when the "company name" node on the input path trie of the "employee DB. xml" and the "company" node on the input path trie of the "resident DB. xml" are set as the same color. In this case, as illustrated in the first row of the combining condition specification table 140*d* illustrated in FIG. 23, the absolute path name "employee DB/employee/company name" of the company name node and the absolute path name "resident DB/resident/name" of the company node are registered, and full coincidence is set as the condition.

When the "name" node on the input path trie of the "employee DB. xml" and the "name" node on the input path trie of the "resident DB. xml" are set as the same color, the instruction reception unit 150*d* receives the combining condition that both "name" fully coincide with each other. In this case, as illustrated in the second row of the combining condition specification table 140*d* illustrated in FIG. 23, the absolute path name "employee DB/employee/name" of the name node and the absolute path name "resident DB/resident/name" of the name node are registered, and full coincidence is set as the condition.

Processing is described when the instruction reception unit 150*d* receives Join points from a user as illustrated in FIGS. 11 and 12. The instruction reception unit 150*d* generates the Join point specification table 140*e* illustrated in FIG. 24 based on the Join points specified by a user. An example is described in which the employee node of the "employee DB. xml" is specified as the Join point. The instruction reception unit 150*d* acquires the absolute path name "/employee DB/employee" of the employee node specified by the user from the input path trie 140*b*, and registers, to the Join point specification table 140*e*, the absolute path name "/employee DB/employee" and the data type "employee DB" so as to correspond to each other (refer to the first row of FIG. 24).

Another example is described in which the TEL node of the "resident DB. xml" is specified as the Join point. The instruction reception unit 150*d* acquires the absolute path name "/resident DB/resident/TEL" of the employee node specified by the user from the input path trie 140*b*, and registers, to the Join point specification table 140*e*, the absolute path name "/resident DB/resident/TEL" and the data type "resident DB" so as to correspond to each other (refer to the second row of FIG. 24).

The increase determination unit 150*e* is a processing unit that determines a reference Join point used as a reference value, and determines to what extent the number of records of combined data generated based on the Join point specified by a user increases as compared with the number of records of combined data generated based on the reference Join point.

First, processing is described in which the increase determination unit 150*e* determines a reference Join point on an input path trie. The increase determination unit 150*e* entirely searches the output path trie 140*c* and extracts the input path names every input data name. For example, referring to the output path trie 140*c* of FIG. 22, the input path names corresponding to the input data name "employee DB. xml" are "/employee DB/employee/name" and "/employee DB/employee/address". The input path name corresponding to the input data name "resident DB. xml" is "/resident DB/resident/TEL".

Subsequently, the increase determination unit 150*e* entirely searches the combining condition specification table 140*d*, and extracts the path names every data type. For example, referring to the combining condition specification table 140*d* of FIG. 23, the path names corresponding to the "employee DB. xml" are "/employee DB/employee/company name" and "/employee DB/employee/name". The path names corresponding to the "resident DB. xml" are "/resident DB/resident/company" and "/resident DB/resident/name".

The increase determination unit 150*e*, then, compares each extracted path with each other every input data to determine common prefixes. The increase determination unit 150*e* determines the node corresponding to the longest path in the paths having the determined common prefixes as the reference Join point.

The paths corresponding to the "employee DB. xml" extracted from the output path trie 140*c* and the combining condition specification table 140*d* are "/employee DB/employee/ID", "/employee DB/employee/address", "/employee DB/employee/company name", and "/employee DB/employee/name". As a result of comparing the paths with each other, the common prefixes are determined as "/employee DB" and "/employee DB/employee". In the paths having the common prefixes, the longest path is "/employee DB/employee". Accordingly, the increase determination unit 150*e* determines that the "employee" node corresponding to "/employee DB/employee" as the reference Join point in the input path trie of the "employee DB. xml".

On the other hand, the paths corresponding to the "resident DB. xml" extracted from the output path trie 140*c* and the combining condition specification table 140*d* are "/resident DB/resident/TEL", "/resident DB/resident/company", and "/resident DB/resident/name". As a result of comparing the paths with each other, the common prefixes are determined as "/resident DB" and "/resident DB/resident". In the paths having the common prefixes, the longest path is "/resident DB/resident". Accordingly, the increase determination unit 150*e* determines that the "resident" node corresponding to "/resident DB/resident" as the reference Join point in the input path trie of the "resident DB. xml".

After determining the reference Join points of the input path trie, the increase determination unit 150*e* determines an increase amount of the number of records of combined data based on the Join points specified by a user as compared with the number of records of combined data based on the reference Join points. Processing performed by the increase determination unit 150*e* is described by defining the reference Join point of data A as KA, the reference Join point of data B as KB, and letting the Join point specified by a user of the data A be UA, and the Join point specified by the user of the data B be UB.

The increase determination unit 150*e*, first, calculates a reference value $\alpha$ based on KA and UA. If KA and UA are equal to each other, the increase determination unit 150*e* sets "1" as the value of the reference value α. On the other hand, if KA and UA are not equal to each other, the increase determination unit 150e calculates the reference value α by multiplying the maximum sibling number of each descendant node (including UA) of UA up to KA in the input path trie of the data A.

The increase determination unit 150e, then, calculates a reference value β based on KB and UB. If KB and UB are equal to each other, the increase determination unit 150e sets "1" as the value of the reference value β. On the other hand, if KB and UB are not equal to each other, the increase determination unit 150e calculates the reference value β by multiplying the maximum sibling number of each descendant node (including UB) of UB up to KB in the input path trie of the data B.

The increase determination unit 150e calculates an increase amount by multiplying the reference value α calculated in the above-described manner by reference value data. For example, the increase determination unit 150e calculates an increase amount α as follows: the increase amount α=α×β. The increase determination unit 150e, then, outputs the calculated increase amount α to a display. A user can figure out an increase amount of the number of records based on the Join points specified by the user oneself from the increase amount α calculated by the increase determination unit 150e. The user can also take action, such as setting the Join point again depending on the increase amount.

Figure 31:
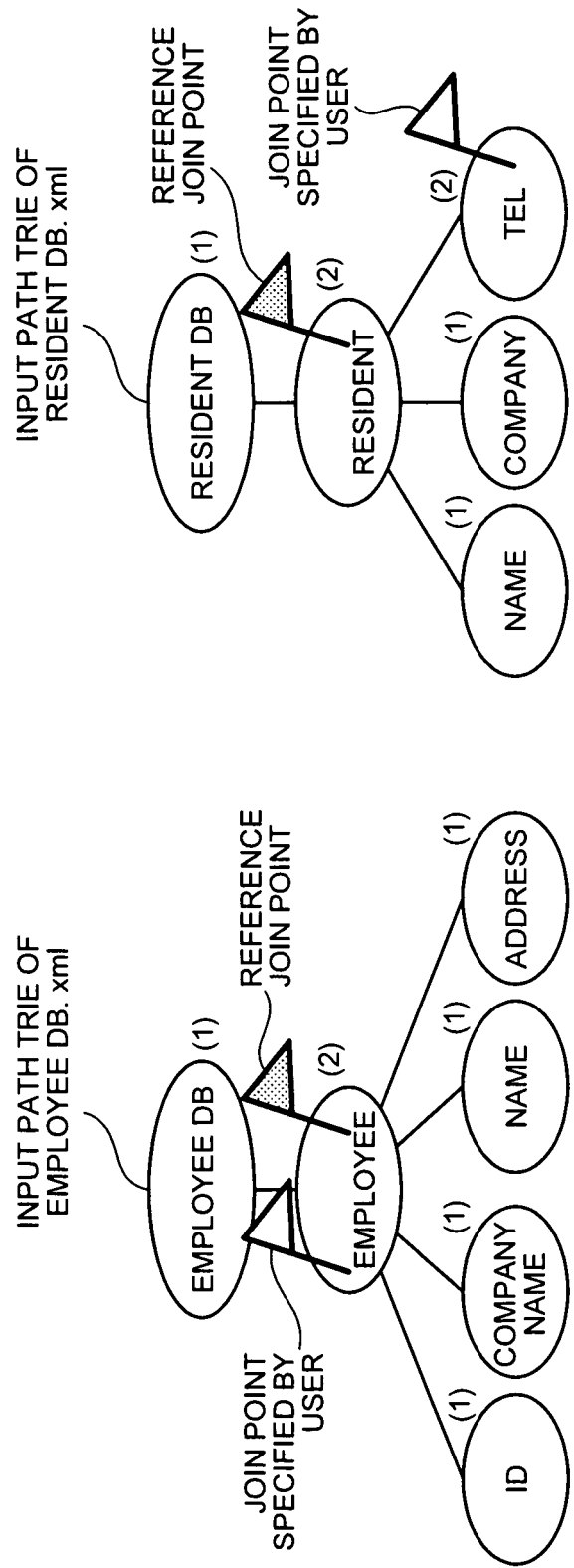
FIG. 31 is a schematic for explaining processing by an increase determination unit.

Processing performed by the increase determination unit 150e is described by using specific examples. FIG. 31 is a schematic to explain the processing performed by the increase determination unit 150e. A number located nearby at a certain node in FIG. 31 represents the maximum sibling number of the node. For expository convenience, let the input path trie of the employee DB. xml be data A while let the input path trie of the resident DB. xml be data B. Let KA and UA to be the employee node of the input path trie of the employee DB. xml. Let the resident node of the input path trie of the resident DB. xml to be KB and the TEL node of the input path trie of the resident DB. xml to be UB.

The increase determination unit 150e, first, calculates the reference value α based on KA and UA. The increase determination unit 150e sets "1" as the reference value α because both of KA and UA are "the employee" nodes.

The increase determination unit 150e, then, calculates the reference value β based on KB and UB. Because KB and UB are not equal to each other, the increase determination unit 150e calculates the reference value β by multiplying the maximum sibling number of each descendant node (including UB) of UB up to KB in the input path trie of the resident DB. xml. In the descendant nodes of UB (including UB), the TEL node is the node up to KB. In this case, the maximum sibling number of the TEL node is set as the reference value β without any change. The increase determination unit 150e sets "2" that is the maximum sibling number of the TEL node as the reference value β.

Figure 32:
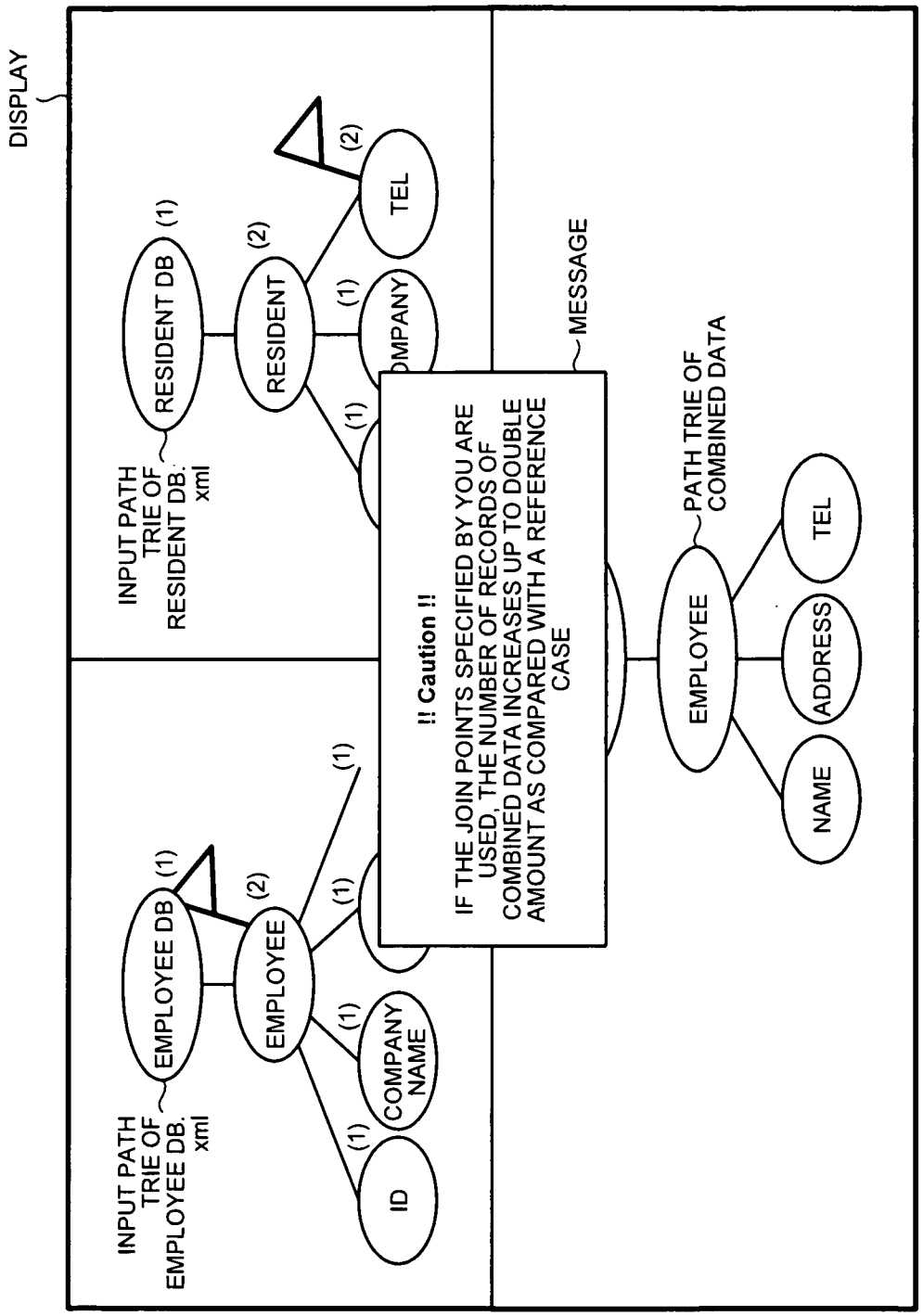
FIG. 32 is a schematic illustrating an exemplary message display output by the increase determination unit.

The increase determination unit 150e calculates an increase amount α (2) by multiplying the reference value α (1) by the reference value (2). The increase determination unit 150e displays a message that "if the Join points specified by you are used, the number of records increases up to double amount as compared with a reference case", for example. FIG. 32 is a schematic illustrating an exemplary message output by the increase determination unit 150e.

In the processing described with reference to FIG. 31, the input path trie aggregating XML data of a small data amount is used for expository convenience. Actual XML data, however, usually has a large data amount. The maximum sibling number of an input path trie aggregating such XML data is a large value. Accordingly, the number of records may markedly increase as compared with that based on the reference value depending on the Join points specified by a user.

Figures 33, 34:
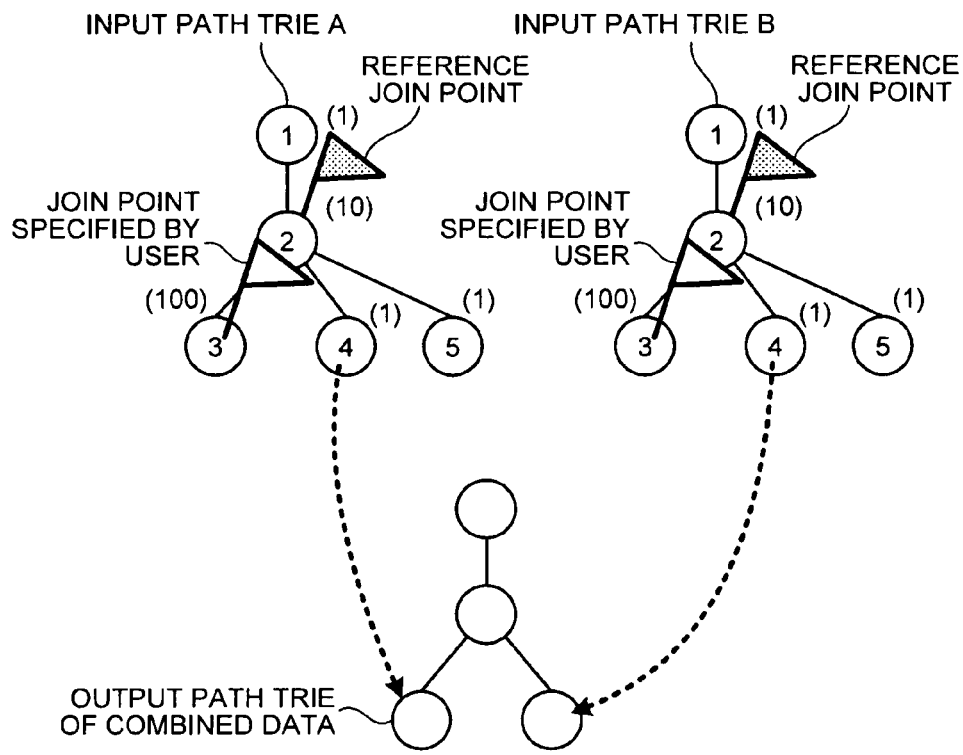
FIG. 33 is a schematic illustrating a case in which the number of records markedly increases.
FIG. 34 is a schematic illustrating an exemplary query that a query generation unit generates.

FIG. 33 is a schematic illustrating a case in which the number of records markedly increases. The increase amount calculated in the same manner as described above is 10000 in an exemplary case illustrated in FIG. 33, in which node 2 of an input path trie A and node 2 of an input path trie B are specified as the reference Join points, and a user specifies node 3 of the input path trie A and node 3 of the input path trie B as the Join points. Accordingly, the number of records of combined data may be 10000 times as large as that based on the reference points, thereby making a heavy impact on storage capacity of a storage device.

Referring back to the explanation of FIG. 15, the query generation unit 150f is a processing unit that generates a query based on the combining condition specification table 140d and the Join point specification table 140e. The query generation unit 150f, first, generates For statements based on the Join point specification table 140e. The query generation unit 150f acquires the path names of the Join points of data A and data B from the combining condition specification table 140d, and puts the names into the For statements.

For example, when the Join point specification table 140e stores the information illustrated in FIG. 24, the query generation unit 150f generates the following For statements.

For $a=/employee DB/employee
For $b=/resident DB/resident/TEL

In this case, the data A is the employee DB (employee DB. xml) while the data B is the resident DB (resident DB. xml).

The query generation unit 150f, then, generates Where statements based on the combining condition specification table 140d and the Join point specification table 140e. The query generation unit 150f generates the Where statement by associating the path name of the data A with the path name of the data B by a condition (combining condition) every row of the combining condition specification table 140d. The path name input into the Where statement is a relative path from the Join point.

An example is described when the combining condition specification table 140d stores the information illustrated in FIG. 23 while the Join point specification table 140e stores the information illustrated in FIG. 24. In the example, the relative path is "company name" because the path name of the employee DB (data A) is "/employee DB/employee/company name" as illustrated in the first row of the combining condition specification table 140d, and the path name of the Join point is "/employee DB/employee".

In addition, because the path name of the resident DB (data B) is "/resident DB/resident/company" as illustrated in the first row of the combining condition specification table 140d and the path name of the Join point is "/resident DB/resident/TEL", the relative path is "../company" (../company represents the parent node of the company node). The query generation unit 150f generates the following Where statement by associating the relative path "company name" with the relative path "../company" by the condition (full coincidence:=).

Where $a/company name=$b/../company

Because the path name of the employee DB is "/employee DB/employee/company name" as illustrated in the second row of the combining condition specification table 140d, and the Join point is "/employee DB/employee", the relative path is "name". In addition, because the path name of the resident DB is "/resident DB/resident/name" as illustrated in the second row of the combining condition specification table 140d and the Join point is "/resident DB/resident/TEL", the relative path is "../name" (../name represents the parent node of name). The query generation unit 150f generates the following Where statement by associating the relative path "name" with the relative path "../name" by the condition (full coincidence:=).

Where $a/name=$b/../name

Subsequently, the query generation unit 150f generates a Return statement based on the output path trie 140c. The query generation unit 150f, first, describes a character string "Return" in the query. The query generation unit 150f, then, refers to each node of the output path trie 140c in pre-order. When the input path name of the referred node is "New", the query generation unit 150f describes the tag name of the referred node in the query with the format of "<tag name>".

On the other hand, when the input path name of the referred node is not "New", the query generation unit 150f calculates a relative path from the Join point by comparing the path name of the referred node with the path name of the Join point, and describes the resultant path in the query with the format of "{$a/relative path}" or "{$b/relative path}". The query generation unit 150f properly supplements a closing tag after referring to all of the nodes in the output path trie 140c.

Exemplary processing performed by the query generation unit 150f to generate a Return statement based on the output path trie 140c illustrated in FIG. 30 is described. In the example, the Join point specification table 140e stores the information illustrated in FIG. 24.

The query generation unit 150f, first, describes "Return" in the query, and then refers to the employee phonebook node. The query generation unit 150f describes <employee phonebook> under "Return" in the query because the input path name of the employee phonebook node is New.

The query generation unit 150f refers to the employee node, and describes <employee> under <employee phonebook> in the query because the input path name of the employee node is New.

The query generation unit 150f refers to the name node, the input path name of which is not New. In this case, the query generation unit 150f calculates a relative path based on the name node and the Join point. Because the input path name of the name node is "/employee DB/employee/name" and the path name of the Join point is "/employee DB/employee", the relative path is "name". The query generation unit 150f describes {$a/name} under <employee> in the query.

The query generation unit 150f refers to the address node, the input path name of which is not New. In this case, the query generation unit 150f calculates a relative path based on the address node and the Join point. Because the input path name of the address node is "/employee DB/employee/address" and the path name of the Join point is "/employee DB/employee", the relative path is "address". The query generation unit 150f describes {$a/address} under {$a/name} in the query.

The query generation unit 150f refers to the TEL node, the input path name of which is not New. In this case, the query generation unit 150f calculates a relative path based on the TEL node and the Join point. Because the input path name of the TEL node is "/resident DB/resident/TEL" and the path name of the Join point is "/resident DB/resident/TEL", the relative path is "absent". The query generation unit 150f describes {$b} under {$a/name} in the query. When the relative path is "absent", the query generation unit 150f simply describes $a (or $b) without adding "/", which is used such as $a/ or $b/.

The query generation unit 150f properly supplements a closing tag after referring to all of the nodes in the output path trie 140c. When referring to all of the nodes in the output path trie 140c illustrated in FIG. 30, the query generation unit 150f describes </employee> and </employee phonebook> in this order under {$b} in the query.

In this manner, the query generation unit 150f generates the For statements, the Where statements, and the Return statement, so that the query 140f is generated. FIG. 34 is a schematic illustrating an exemplary query that the query generation unit 150f generates.

Return back to the explanation of FIG. 15, the combination processing unit 150g combines the XML data 140a based on the query 140f as illustrated in FIG. 5, for example. Processing to combine the XML data 140a based on the query 140f can be performed by using known techniques.

The search processing unit 150h retrieves, when a search query is specified, data corresponding to the search query from XML data, and outputs the search result to the output unit 120. For example, when the search query "Q=/employee DB/employee/ID" is specified to the employee DB. xml, the search processing unit 150h outputs text data corresponding to the ID node of the employee DB. xml as the search result.

Figure 35:
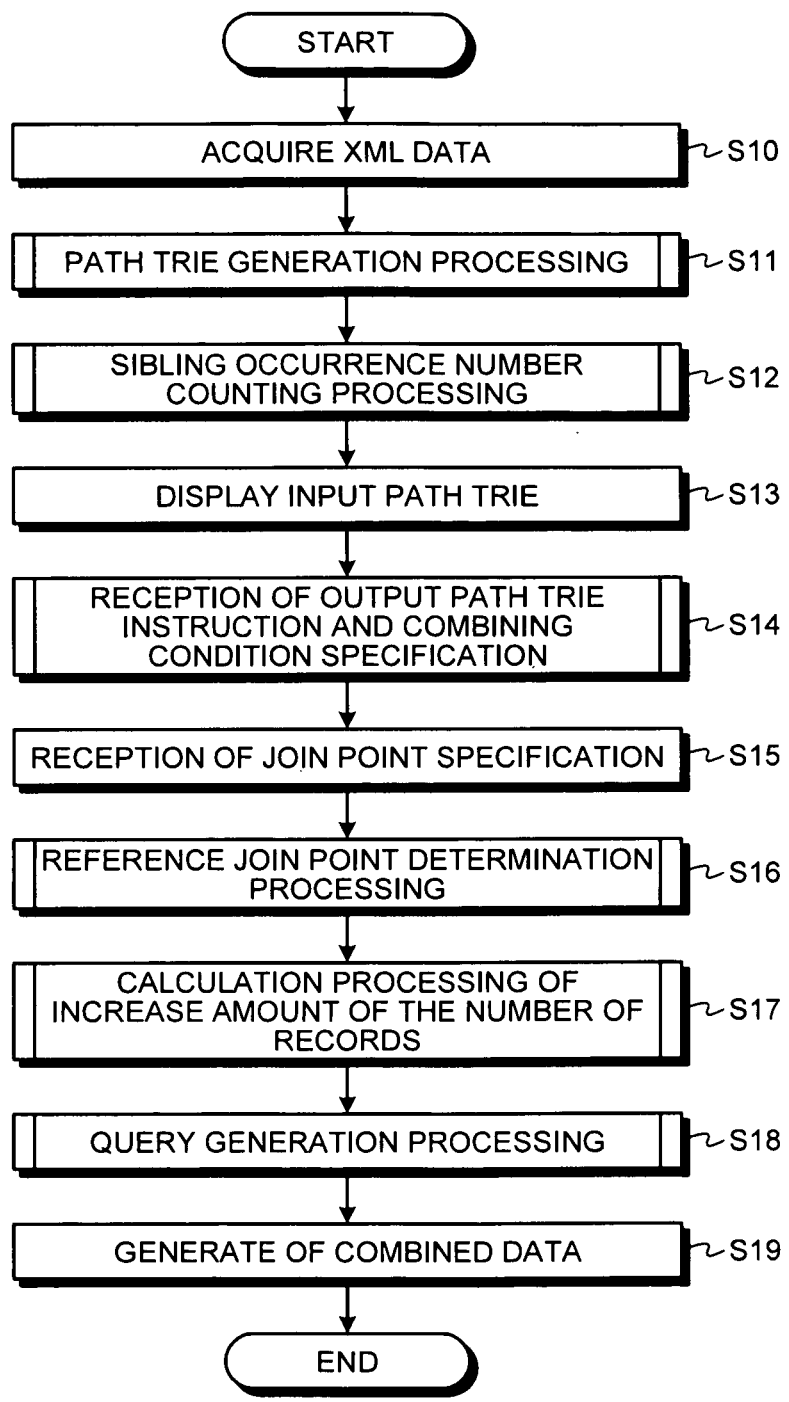
FIG. 35 is a flowchart illustrating a processing procedure of the search device according to the present embodiment.

A processing procedure of the search device 100 according to the embodiment is described below. FIG. 35 is a flowchart illustrating the processing procedure of the search device 100 according to the embodiment. As illustrated in FIG. 35, the search device 100 acquires the XML data 140a (step S10). The path trie generation unit 150a performs path trie generation processing (step S11), and performs sibling occurrence number counting processing (step S12).

The path trie display unit 150c displays the resulting input path trie (step S13). The instruction reception unit 150d receives an output path trie specification, combining condition specification (step S14), and Join point specification (step S15).

The increase determination unit 150e performs reference Join point determination processing (step S16), and performs calculation processing of an increase amount of the number of records (step S17). The query generation unit 150f performs query generation processing (step S18). The combination processing unit 150g generates combined data based on the query 140f (step S19).

Figure 36:
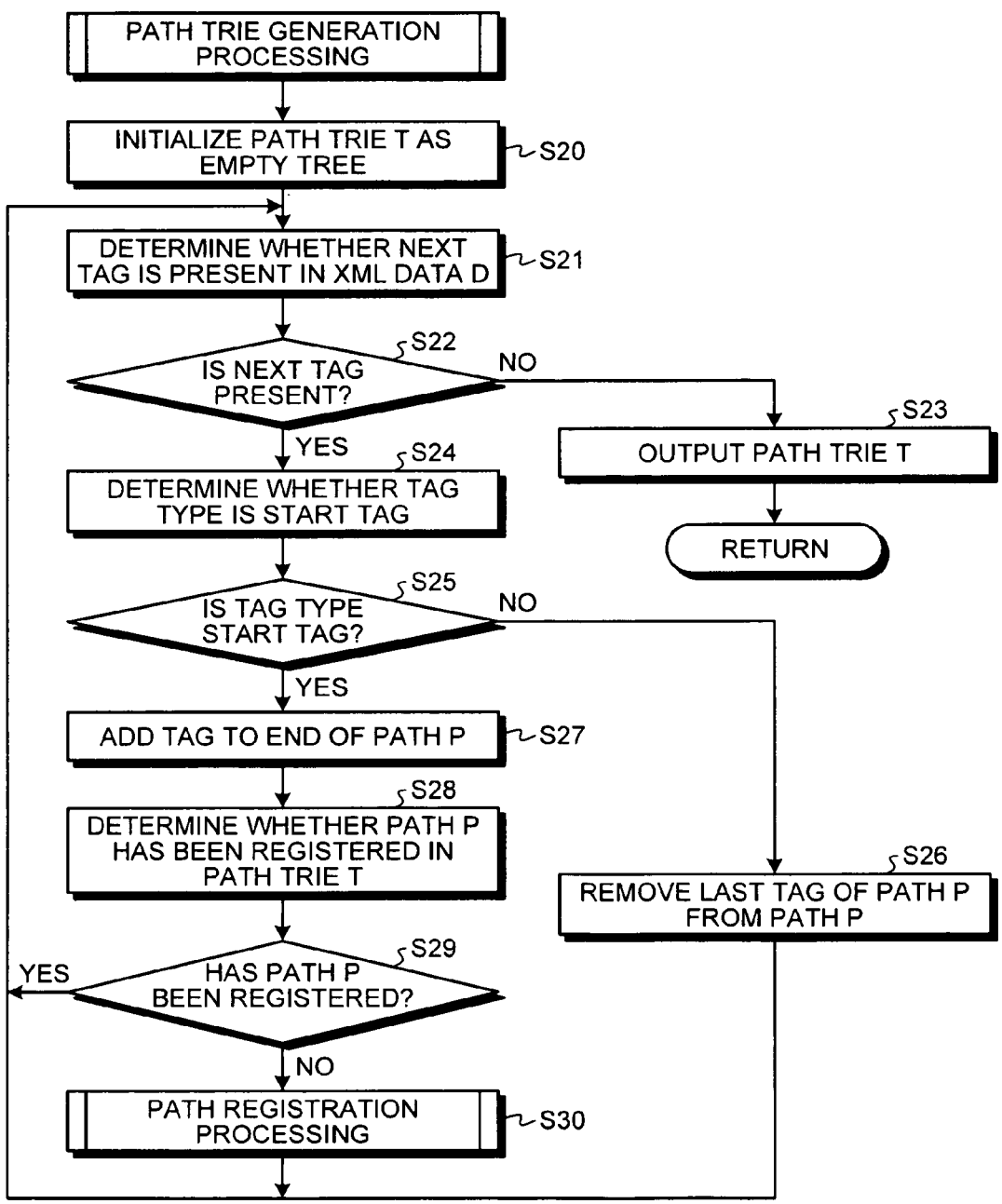
FIG. 36 is a flowchart illustrating a processing procedure of path trie generation processing.

The path trie generation processing illustrated at step S11 of FIG. 35 is described below. FIG. 36 is a flowchart illustrating a processing procedure of the path trie generation processing. As illustrated in FIG. 36, the path trie generation unit 150a initializes a path trie T as an empty tree (step S20), and determines whether the next tag "<" or "</" is present in XML data D (step S21).

If the next tag is absent (NO at step S22), the path trie generation unit 150a outputs the path trie T (step S23). On the other hand, if the next tag is present (YES at step S22), the path trie generation unit 150a determines whether the tag type is a start tag (step S24). Herein, the tag "<" represents the start tag while the tag "</" represents an end tag.

If the tag type is the end tag (NO at step S25), the path trie generation unit 150a removes a last tag of a path P from the path P (step S26), and moves to step S21. On the other hand, if the tag type is the start tag (YES at step S25), the path trie generation unit 150a adds a tag to the end tag of the path P (step S27).

Then, the path trie generation unit 150a determines whether the path P has been registered in the path trie T (step S28). If the path P has been registered (YES at step S29), the path trie generation unit 150a moves to step S21. On the other hand, if the path P has not been registered (NO at step S29), the path trie generation unit 150a performs path registration processing (step S30).

Figure 37:
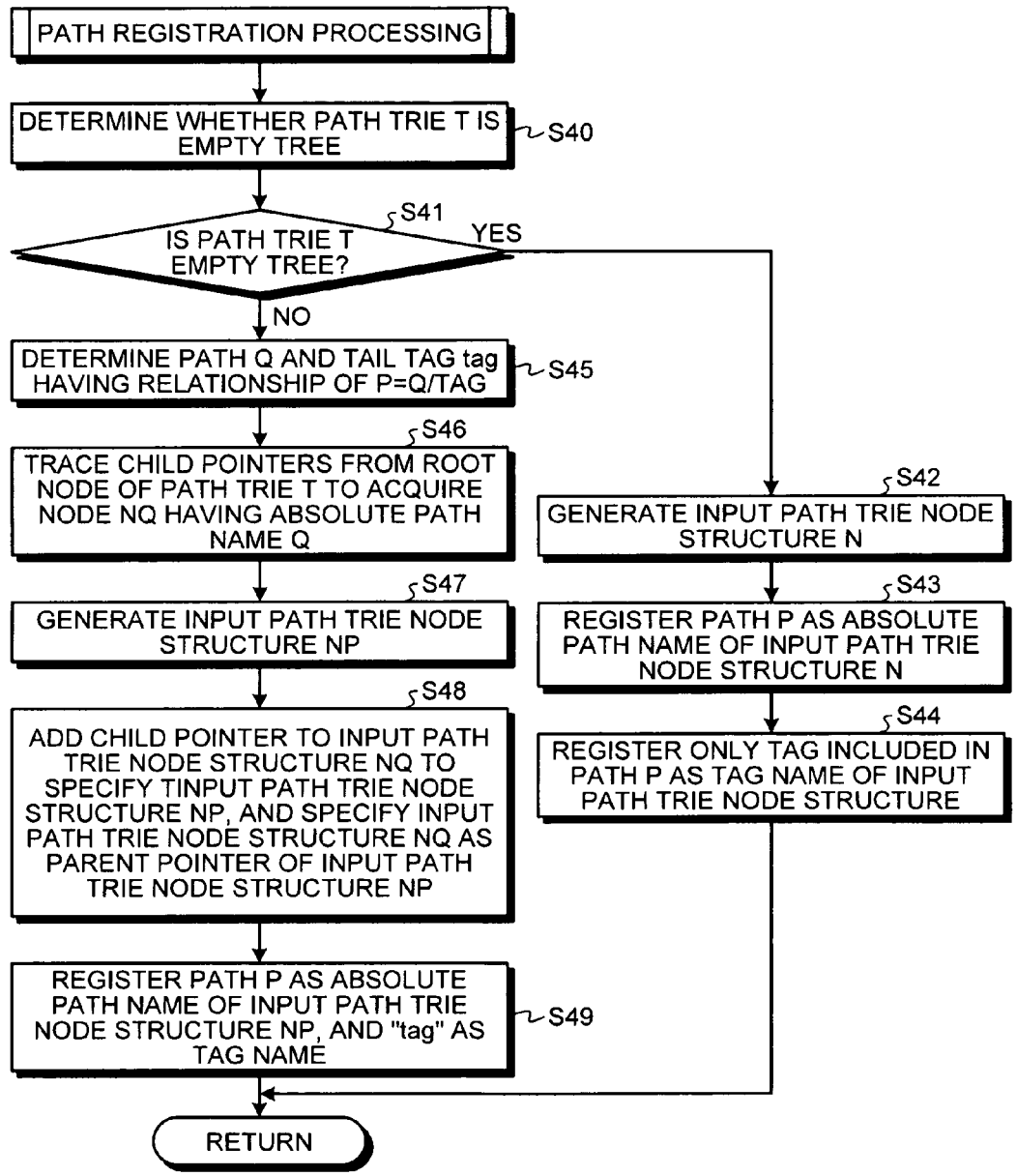
FIG. 37 is a flowchart illustrating a processing procedure of path registration processing.

The path trie registration processing illustrated at step S30 of FIG. 36 is described below. FIG. 37 is a flowchart illustrating a processing procedure of the path trie registration processing. As illustrated in FIG. 37, the path trie generation unit 150a determines whether the path trie T is an empty tree (step S40).

If the path trie T is an empty tree (YES at step S41), the path trie generation unit 150a generates an input path trie node structure N (step S42), registers the path P as the absolute path name of the input path trie node structure N (step S43), and registers the only tag included in the path P as the tag name of the input path trie node structure N (step S44).

On the other hand, if the path trie T is not an empty tree (NO at step S41), the path trie generation unit 150a determines a path Q and a tail tag "tag" having the relationship of P=Q/tag (step S45), and traces the child pointers from the root node of the path trie T to acquire a node NQ having an absolute path name Q (step S46).

Then, the path trie generation unit 150a generates an input path trie node structure NP (step S47), adds a child pointer to the input path trie node structure NQ to specify the input path trie node structure NP, and specifies the input path trie node structure NQ as the parent pointer of the input path trie node structure NP (step S48). Further, the path trie generation unit 150a registers the path P as the absolute path name of the input path trie node structure NP, and "tag" as the tag name (step S49).

Figure 38:
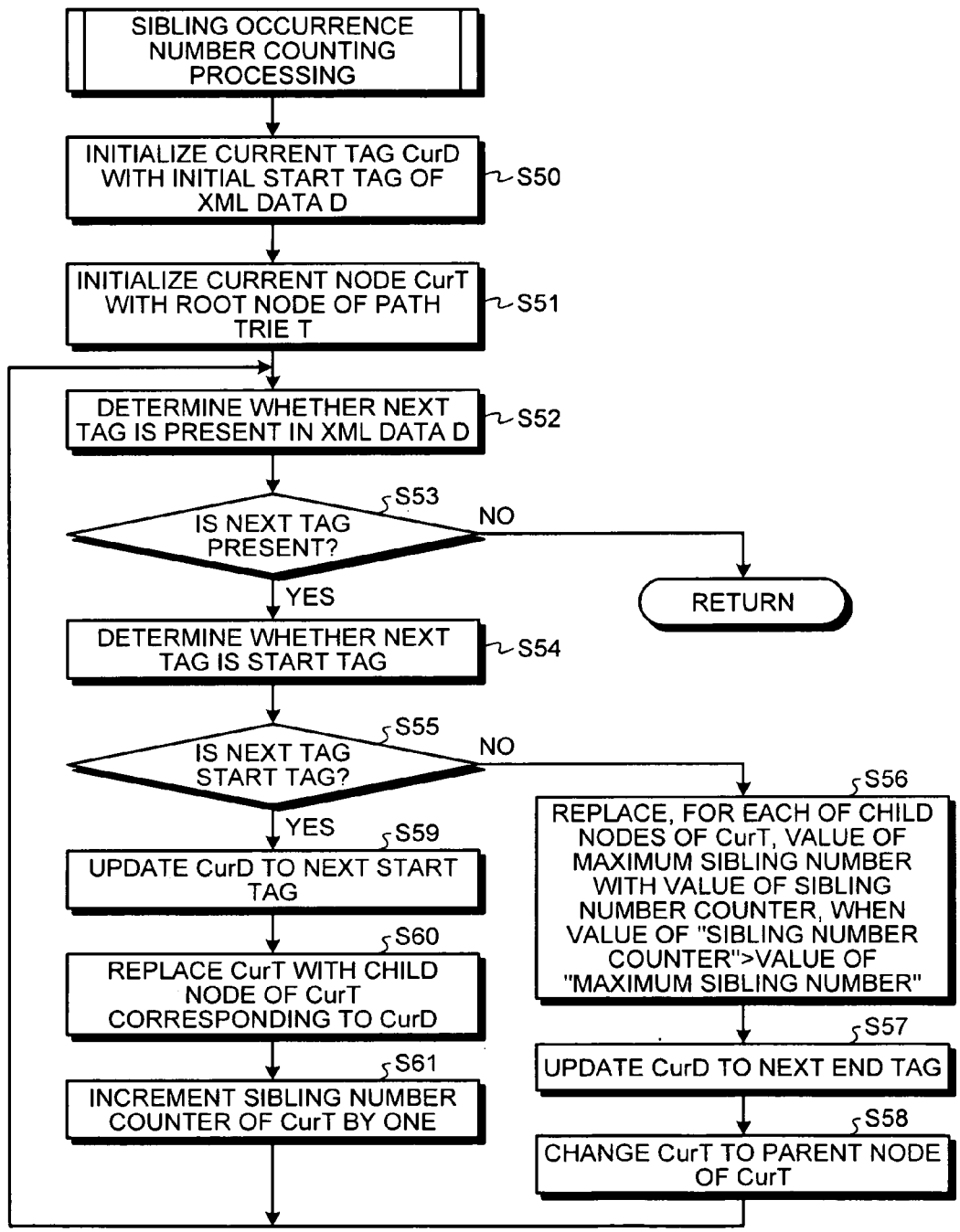
FIG. 38 is a flowchart illustrating a processing procedure of sibling occurrence number counting processing.

The sibling occurrence number counting processing illustrated at step S12 of FIG. 35 is described below. FIG. 38 is a flowchart illustrating a processing procedure of sibling occurrence number counting processing. As illustrated in FIG. 38, the sibling occurrence number counting unit 150b initializes a current tag CurD with the initial start tag of the XML data D (step S50), and initializes a current node CurT with the root node of the path trie T (step S51).

The sibling occurrence number counting unit 150b determines whether the next tag is present in the XML data D (step S52). If the next tag is absent (NO at step S53), the sibling occurrence number counting unit 150b completes the sibling occurrence number counting processing. On the other hand, if the next tag is present in the XML data D (YES at step S53), the sibling occurrence number counting unit 150b determines whether the next tag is the start tag (step S54).

If the next tag is the end tag (NO at step S55), the sibling occurrence number counting unit 150b replaces, for each of the child nodes of the current node CurT, a value of the maximum sibling number with a value of a sibling number counter, when the value of "the sibling number counter">the value of "the maximum sibling number" (step S56).

The sibling occurrence number counting unit 150b updates the current tag CurD to the next end tag (step S57), changes the current node CurT to the parent node of the current node CurT (step S58), and moves to step S52.

If the next tag is the start tag (YES at step S55), the sibling occurrence number counting unit 150b updates the current tag CurD to the next start tag (step S59), and replaces the current node CurT with the child node of the current node CurT corresponding to the current tag CurD (step S60). Further, the sibling occurrence number counting unit 150b increments the sibling number counter of the current node CurT by one (step S61), and moves to step S52.

The reception of the output path trie specification and the combining condition specification illustrated at step S14 of FIG. 35 is described below. At step S14, the instruction reception unit 150d performs various reception processing according to operation of a user operating the input unit 110. The reception processing includes new node generation processing, node copy processing, link adding processing between nodes, link deleting processing between nodes, reception processing of combining condition specification, and Join point specification processing.

Figure 39:
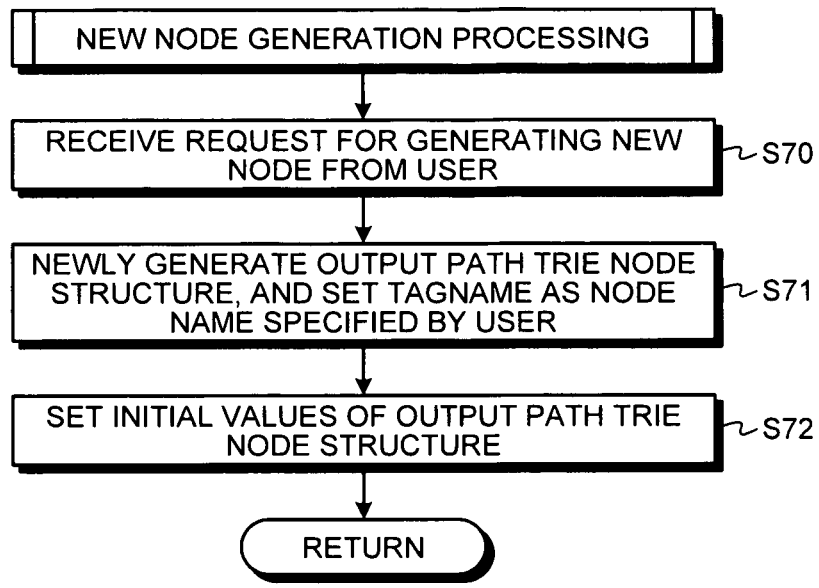
FIG. 39 is a flowchart illustrating a processing procedure of new node generation processing.

First, a processing procedure of the new node generation processing is described. The new node generation processing is performed by the instruction reception unit 150d when a request for newly generating an employee phonebook node and an employee node is received from a user as illustrated in FIG. 8, for example. FIG. 39 is a flowchart illustrating the processing procedure of the new node generation processing.

As illustrated in FIG. 39, the instruction reception unit 150d receives a request for generating a new node from a user (step S70), newly generates an output path trie node structure, and sets tagname as the node name specified by the user (step S71).

The instruction reception unit 150d sets initial values of the output path trie node structure (step S72). At step S72, the instruction reception unit 150d sets "tagname" as the tag name of the output path trie node structure, Null as the absolute path name, Null as the absolute path ID, New as the input data name, and New as the output path ID. Further, the instruction reception unit 150d sets Null for all of the parent pointers and child pointer lists.

Figure 40:
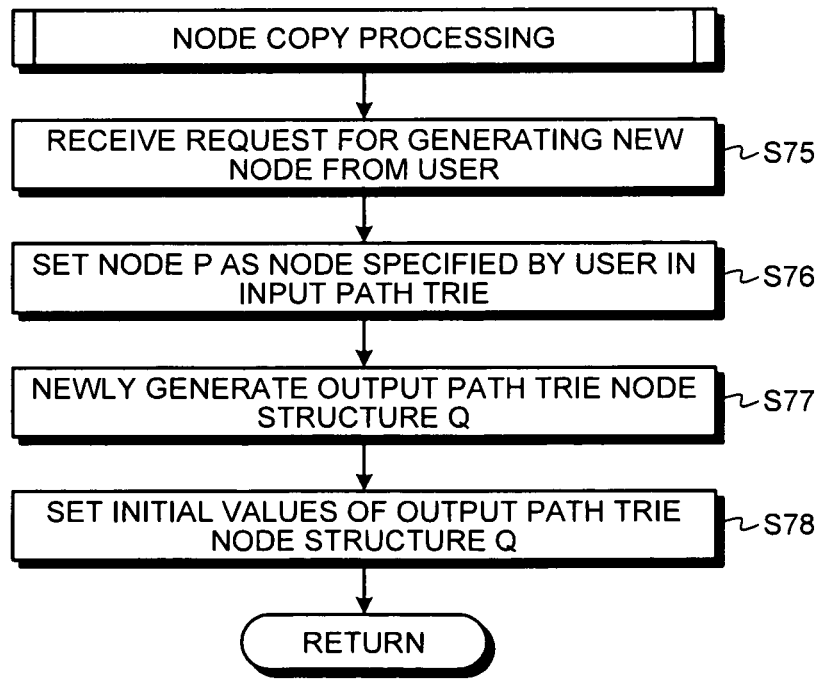
FIG. 40 is a flowchart illustrating a processing procedure of node copy processing.

A processing procedure of the node copy processing is described below. The node copy processing is performed, when the name node, the address node, and TEL node of the input path trie are copied so as to connect them to the output path trie as illustrated in FIG. 9, for example. FIG. 40 is a flowchart illustrating the processing procedure of the node copy processing.

As illustrated in FIG. 40, the instruction reception unit 150d receives a request for generating a new node from a user (step S75), and sets a node P as the node specified by the user in an input path trie (step S76).

The instruction reception unit 150d newly generates an output path trie node structure Q (step S77), and sets initial values of the output path trie node structure Q (step S78). At step S78, the instruction reception unit 150d registers the tag name, the input data name, the input path name, and the input path ID of the node P to the tag name, the input data name, the input path name, and the input path ID of the output path trie node structure Q.

At step S78, the instruction reception unit 150d further sets Null as the absolute path name of the output path trie node structure Q, and sets Null as the absolute path ID. Further, the instruction reception unit 150d sets Null for all of the parent pointers and child pointer lists of the output path trie node structure Q.

Figure 41:
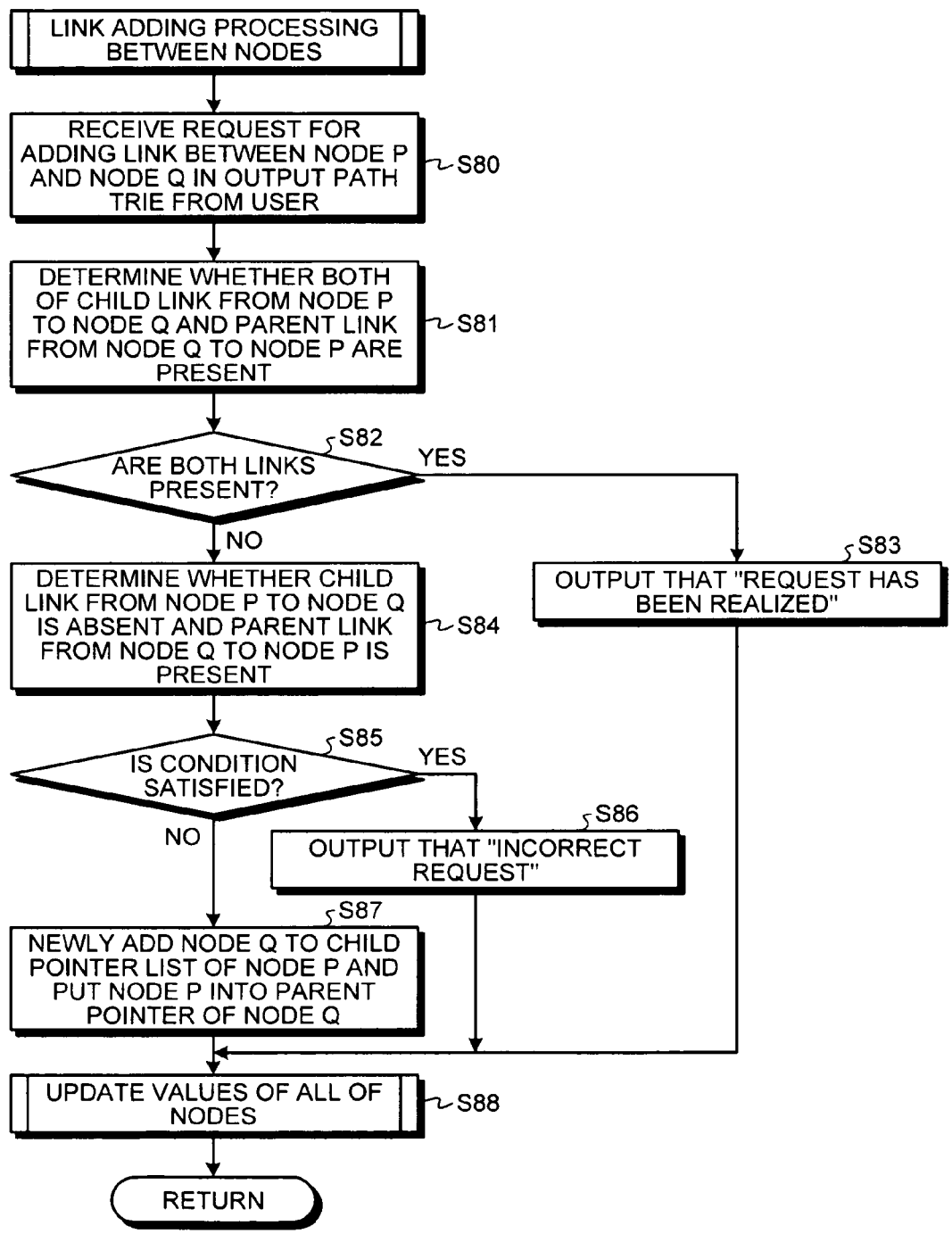
FIG. 41 is a flowchart illustrating a processing procedure of link adding processing between nodes.

The link adding processing between nodes is described below. In the link adding processing between nodes, output path trie node structures are linked with each other. For example, processing to link the output path trie node structure P of the name node with the output path trie node structure Q of the employee node in FIG. 9 corresponds to the link adding processing between nodes. FIG. 41 is a flowchart illustrating a processing procedure of the link adding processing between nodes.

As illustrated in FIG. 41, the instruction reception unit 150d receives a request for adding a link between a node P and a node Q in an output path trie from a user (step S80). In FIG. 41, the node P corresponds to the output path trie node structure P while the node Q corresponds to the output path trie node structure Q.

The instruction reception unit 150d determines whether both of the child link from the node P to the node Q and the parent link from the node Q to the node P are present (step S81). If both of the child link and the parent link are present (YES at step S82), the instruction reception unit 150d outputs that "the request has been realized" (step S83), and moves to step S88.

If both of the child link from the node P to the node Q and the parent link from the node Q to the node P are absent (NO at step S82), the instruction reception unit 150d determines whether the child link from the node P to the node Q is absent and the parent link from the node Q to the node P is present (step S84). If the child link from the node P to the node Q is absent and the parent link from the node Q to the node P is present (the condition is satisfied) (YES at step S85), the instruction reception unit 150d outputs that "incorrect request" (step S86), and moves to step S88.

On the other hand, if the child link from the node P to the node Q is present or the parent link from the node Q to the node P is absent (the condition is not satisfied) (NO at step S85), the instruction reception unit 150d newly adds the node Q to the child pointer list of the node P and puts the node P into the parent pointer of the node Q (step S87). Then, the instruction reception unit 150d updates the values of all of the nodes (step S88).

Figure 42:
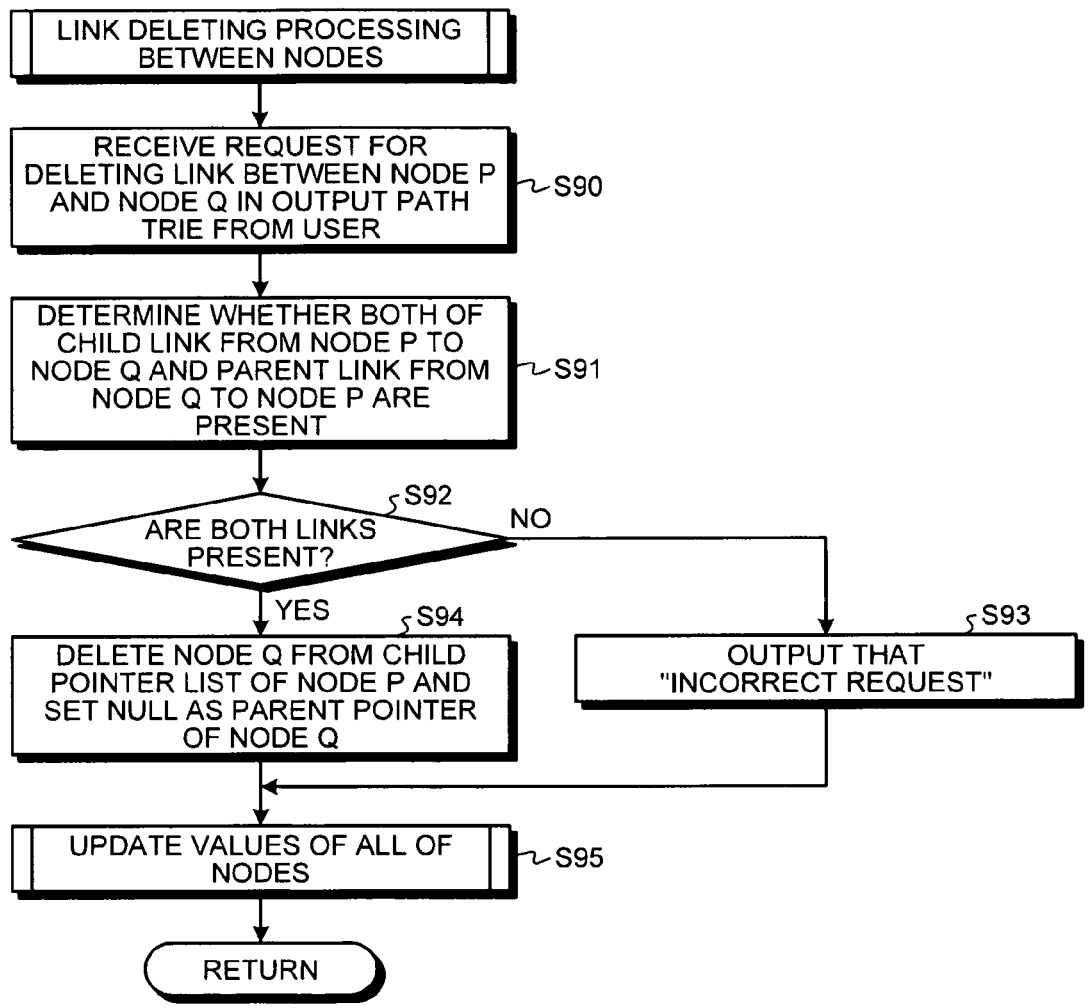
FIG. 42 is a flowchart illustrating a processing procedure of link deleting processing between nodes.

The link deleting processing between nodes is described below. In the link deleting processing between nodes, a link between output path trie node structures is canceled. FIG. 42 is a flowchart illustrating a processing procedure of the link deleting processing between nodes.

As illustrated in FIG. 42, the instruction reception unit 150d receives a request for deleting a link between a node P and a node Q in an output path trie from a user (step S90). In FIG. 42, the node P corresponds to the output path trie node structure P while the node Q corresponds to the output path trie node structure Q.

The instruction reception unit 150d determines whether both of a child link from the node P to the node Q and a parent link from the node Q to the node P are present (step S91). If both of the child link and the parent link are absent (NO at step S92), the instruction reception unit 150d outputs that "incorrect request", and moves to step S93.

On the other hand, if both of the child link from the node P to the node Q and the parent link from the node Q to the node P are present (YES at step S92), the instruction reception unit 150d deletes the node Q from the child pointer list of the node P and sets Null as the parent pointer of the node Q (step S94). Then, the instruction reception unit 150d updates the values of all of the nodes (step S95).

Figure 43:
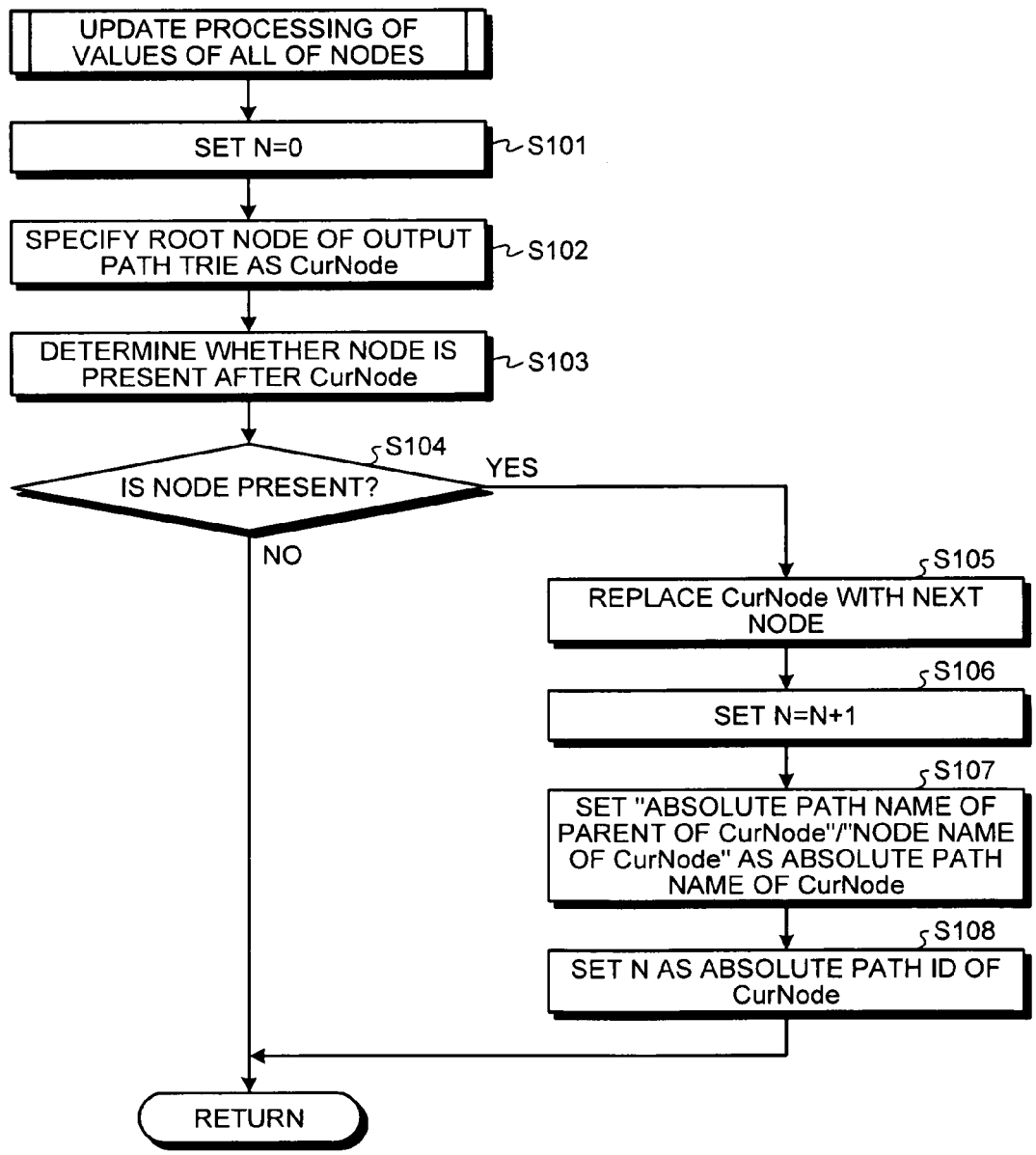
FIG. 43 is a flowchart illustrating a processing procedure of update processing of the values of all of the nodes.

The update processing of the values of all of the nodes illustrated at step S88 of FIG. 41 and at step S95 of FIG. 42 is described below. FIG. 43 is a flowchart illustrating a processing procedure of the update processing of the values of all of the nodes.

As illustrated in FIG. 43, the instruction reception unit 150d sets N=0 (step S101), sets the root node of an output path trie as a CurNode (step S102), and determines whether a node is present after the CurNode (step S103). In the description of FIG. 43, the instruction reception unit 150d traces all of the output path trie node structures from the root node as far as the instruction reception unit 150d can trace in pre-order.

If the next node is absent (NO at step S104), the instruction reception unit 150d completes the update processing of the values of all of the nodes. On the other hand, if the next node is present (YES at step S104), the instruction reception unit 150d replaces the CurNode with the next node (step S105), and sets N=N+1 (step S106).

The instruction reception unit 150d sets "the absolute path name of the parent of the CurNode"/"the node name of the CurNode" as the absolute path name of the CurNode (step S107), and sets N as the absolute path ID of the CurNode (step S108).

The reception processing of combining condition specification is described below. In the reception processing of combining condition specification, when a combining condition is specified, the combining condition is registered in the combining condition specification table 140d. For example, processing to register "full coincidence" as the combining condition when the company name node of the path trie of the employee DB. xml and the company node of the path trie of the resident DB. xml are specified in FIG. 10 corresponds to the reception processing of combining condition specification.

Figure 44:
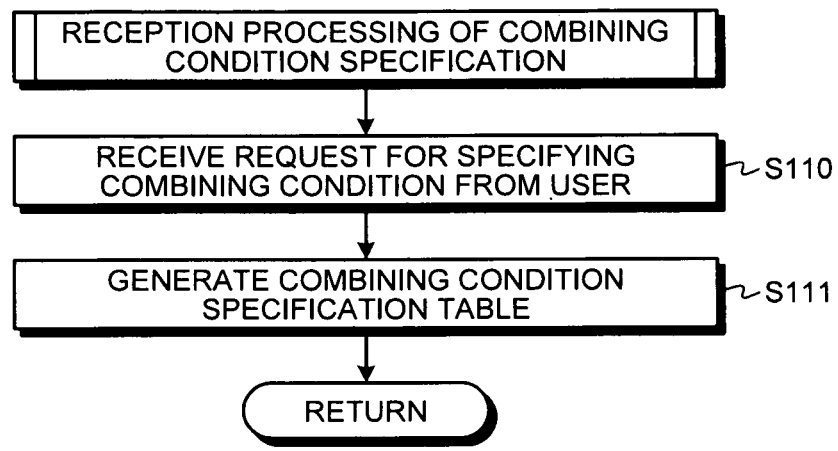
FIG. 44 is a flowchart illustrating a processing procedure of reception processing of combining condition specification.

FIG. 44 is a flowchart illustrating a processing procedure of the reception processing of combining condition specification. As illustrated in FIG. 44, the instruction reception unit 150d receives a request for specifying a combining condition from a user (step S110), and generates the combining condition specification table 140d (step S111).

At step S110, the specification of the combining condition is given as a three-item set (P, Q, A), for example. P is a node of one input path trie. Q is a node of the other input path trie. A is a condition for P and Q.

The Join point specification processing is described below. In the Join point specification processing, when Join points are specified on input path tries, the path name of the Join points are registered in the Join point specification table 140e. For example, processing when the employee node and the resident node are specified as the Join points in FIG. 11 corresponds to the Join point specification processing.

Figure 45:
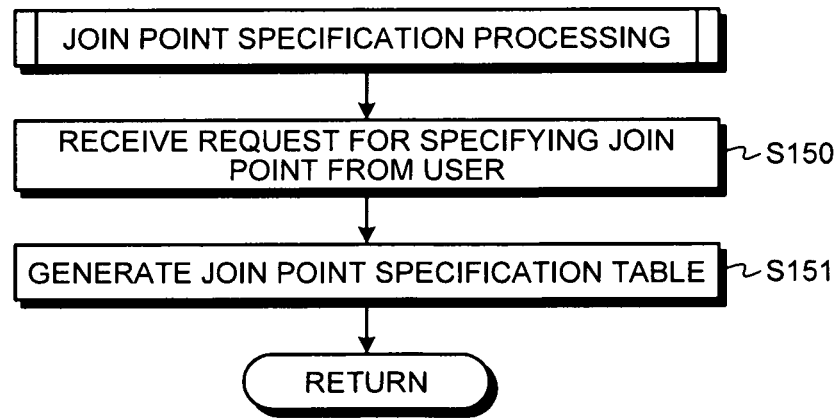
FIG. 45 is a flowchart illustrating a processing procedure of Join point specification processing.

FIG. 45 is a flowchart illustrating a processing procedure of the Join point specification processing. As illustrated in FIG. 45, the instruction reception unit 150d receives a request for specifying Join points from a user (step S150), and generates the Join point specification table 140e (step S151). At step S150, the Join point specification is given as a two-item set (D, P), for example. D represents a data name. P corresponds to a node of the path trie of D.

Figure 46:
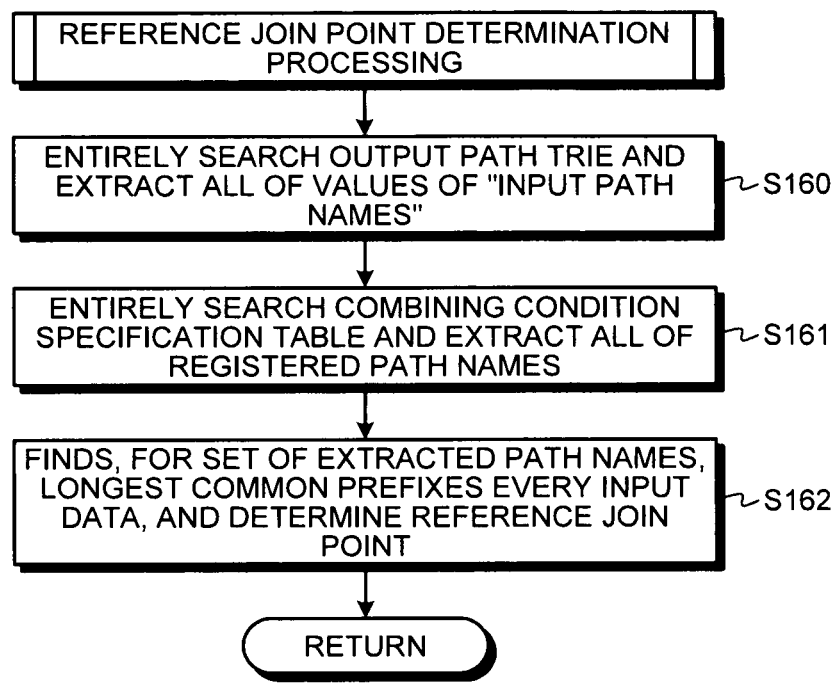
FIG. 46 is a flowchart illustrating a processing procedure of reference Join point determination processing.

The reference Join point determination processing illustrated at step S16 of FIG. 35 is described below. In the reference Join point determination processing, the increase determination unit 150e determines a reference Join point. FIG. 46 is a flowchart illustrating a processing procedure of the Join point determination processing. As illustrated in FIG. 46, the increase determination unit 150e entirely searches the output path trie 140c and extracts all of the values of "input path names" (step S160).

The increase determination unit 150e entirely searches the combining condition specification table 140d and extracts all of the registered path names (step S161). The increase determination unit 150e finds, for the set of the extracted path names, longest common prefixes every input data, and determines a reference Join point (step S162).

The calculation processing of an increase amount of the number of records illustrated at step S17 of FIG. 35 is described below. In the calculation processing of an increase amount of the number of records, the increase determination unit 150e determines to what extent the number of records of combined data generated based on Join points specified by a user increases as compared with the number of records of combined data generated based on reference Join points.

Figure 47:
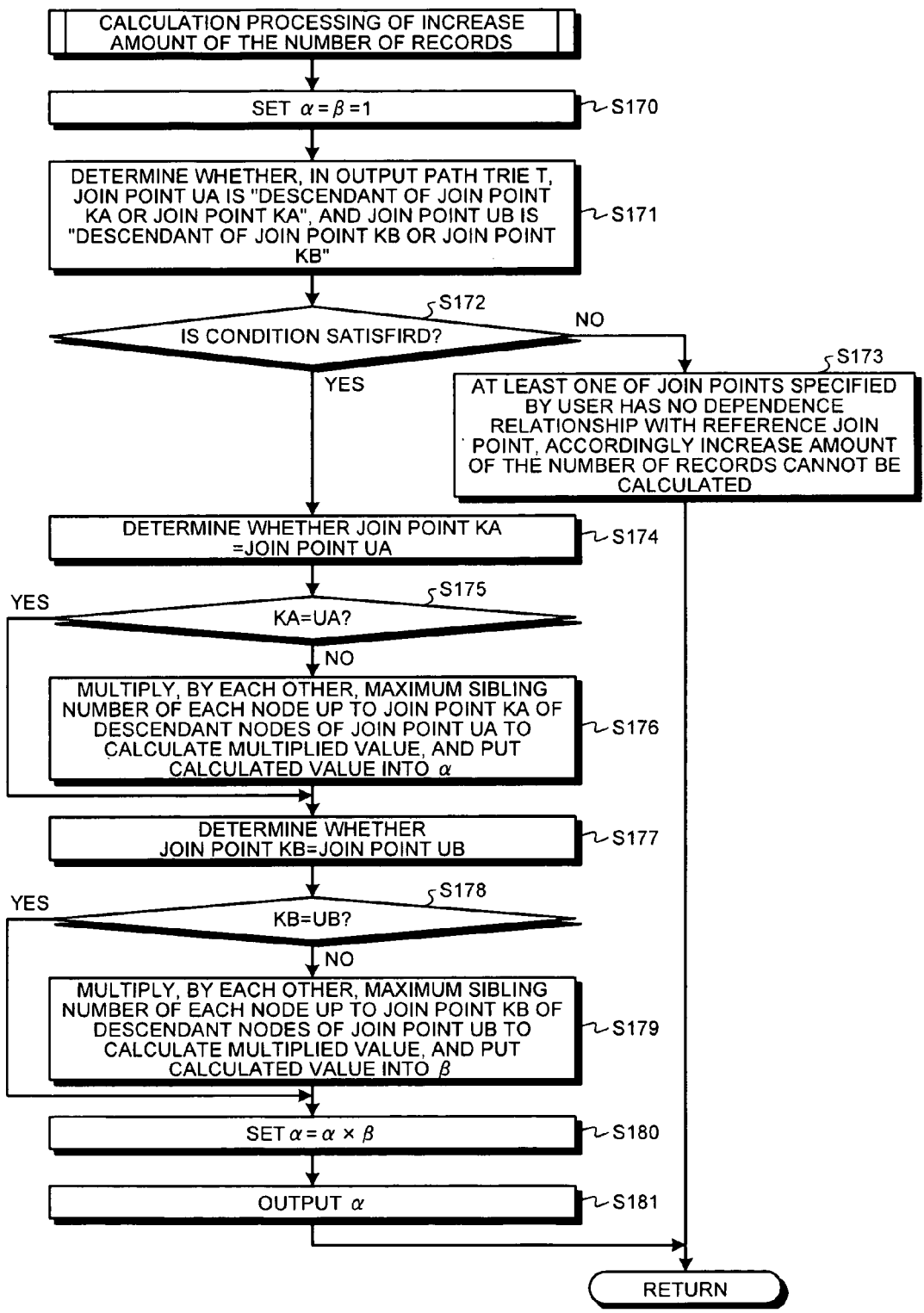
FIG. 47 is a flowchart illustrating a processing procedure of calculation processing of an increase amount of the number of records.

FIG. 47 is a flowchart illustrating a processing procedure of the calculation processing of an increase amount of the number of records. As illustrated in FIG. 47, the increase determination unit 150e sets $\alpha=\beta=1$ (step S170), and determines whether, in an output path trie T, a Join point UA is "the descendant of a Join point KA or the join point KA", and a Join point UB is "the descendant of a Join point KB or the Join point KB" (step S171).

If the Join point UA is not "the descendant of the Join point KA or the Join point KA", or the Join point UB is not "the descendant of the Join point KB or the Join point KB", (NO at step S172), the increase determination unit 150e outputs error, for example. In such a case, at least one of the Join points specified by a user has no dependence relationship with the reference Join point. Accordingly, the increase determination unit 150e cannot calculate an increase amount of the number of records (step S173).

On the other hand, if the Join point UA is "the descendant of the Join point KA or the Join point KA", and the Join point UB is "the descendant of the Join point KB or the Join point KB" (YES at step S172), the increase determination unit 150e determines whether the Join point KA=the Join point UA (step S174).

If the Join point KA=the Join point UA (YES at step S175), the increase determination unit 150e moves to step S177. On the other hand, if the Join point KA≠the Join point UA (NO at step S175), the increase determination unit 150e multiplies, by each other, the maximum sibling number of each node up to the Join point KA of the descendant nodes of the Join point UA to calculate a multiplied value, and puts the calculated value into α (step S176).

The increase determination unit 150e determines whether the Join point KB=the Join point UB (step S177). If the Join point KB=the Join point UB (YES at step S178), the increase determination unit 150e moves to step S180.

On the other hand, if the Join point KB≠the Join point UB, the increase determination unit 150e multiplies, by each other, the maximum sibling number of each node up to the Join point KB of the descendant nodes of the Join point UB to calculate a multiplied value, and puts the calculated value into β (step S179). The increase determination unit 150e sets α=α×β (step S180), and outputs the resultant α to the output unit 120 as an index of the increase amount (step S181).

Figure 48:
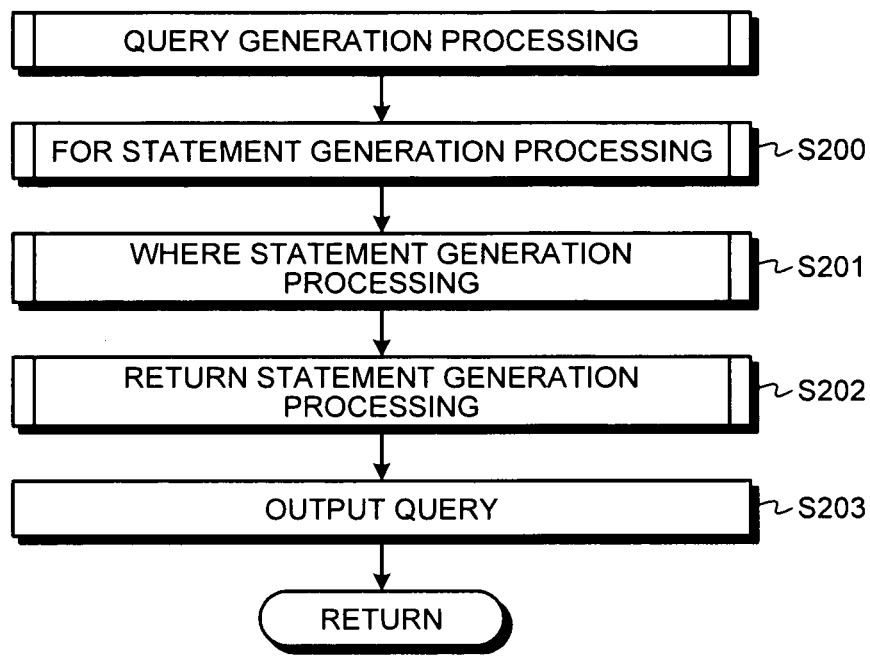
FIG. 48 is a flowchart illustrating a processing procedure of query generation processing.

The query generation processing illustrated at step S18 of FIG. 35 is described below. The query generation processing is performed by the query generation unit 150f to generate a query based on the combining condition specification table 140d and the Join point specification table 140e. FIG. 48 is a flowchart illustrating a processing procedure of the query generation processing.

As illustrated in FIG. 48, the query generation unit 150f performs processing to generate a For statement (step S200), and performs processing to generate a Where statement (step S201). Then, the query generation unit 150f performs processing to generate a Return statement (step S202), and outputs a query (step S203).

Figure 49:
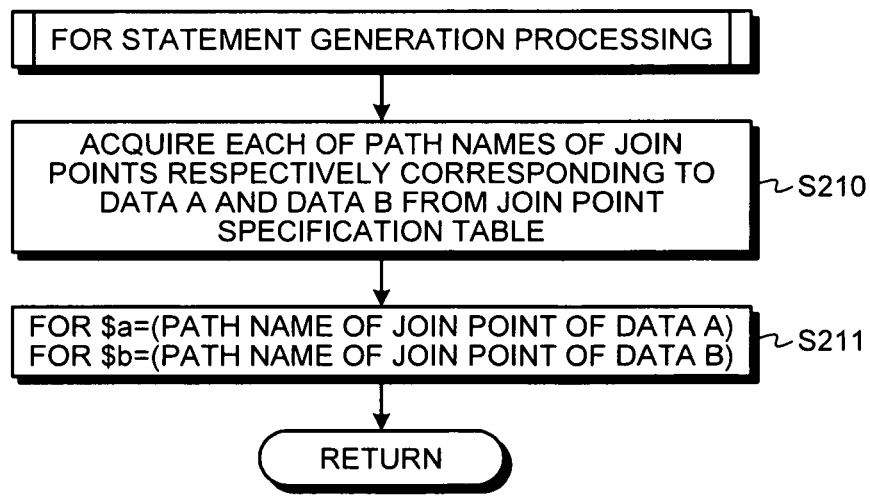
FIG. 49 is a flowchart illustrating a processing procedure of processing to generate a For statement.

The processing to generate a For statement illustrated at step S200 of FIG. 48 is described below. FIG. 49 is a flowchart illustrating a processing procedure of the processing to generate a For statements. As illustrated in FIG. 49, the query generation unit 150f acquires each of the path names of the Join points respectively corresponding to data A and data B from the Join point specification table 140e (step S210).

The query generation unit 150f generates the following For statements (step S211).

For $a=(the path name of the Join point of the data A)
For $b=(the path name of the Join point of the data B)

Figure 50:
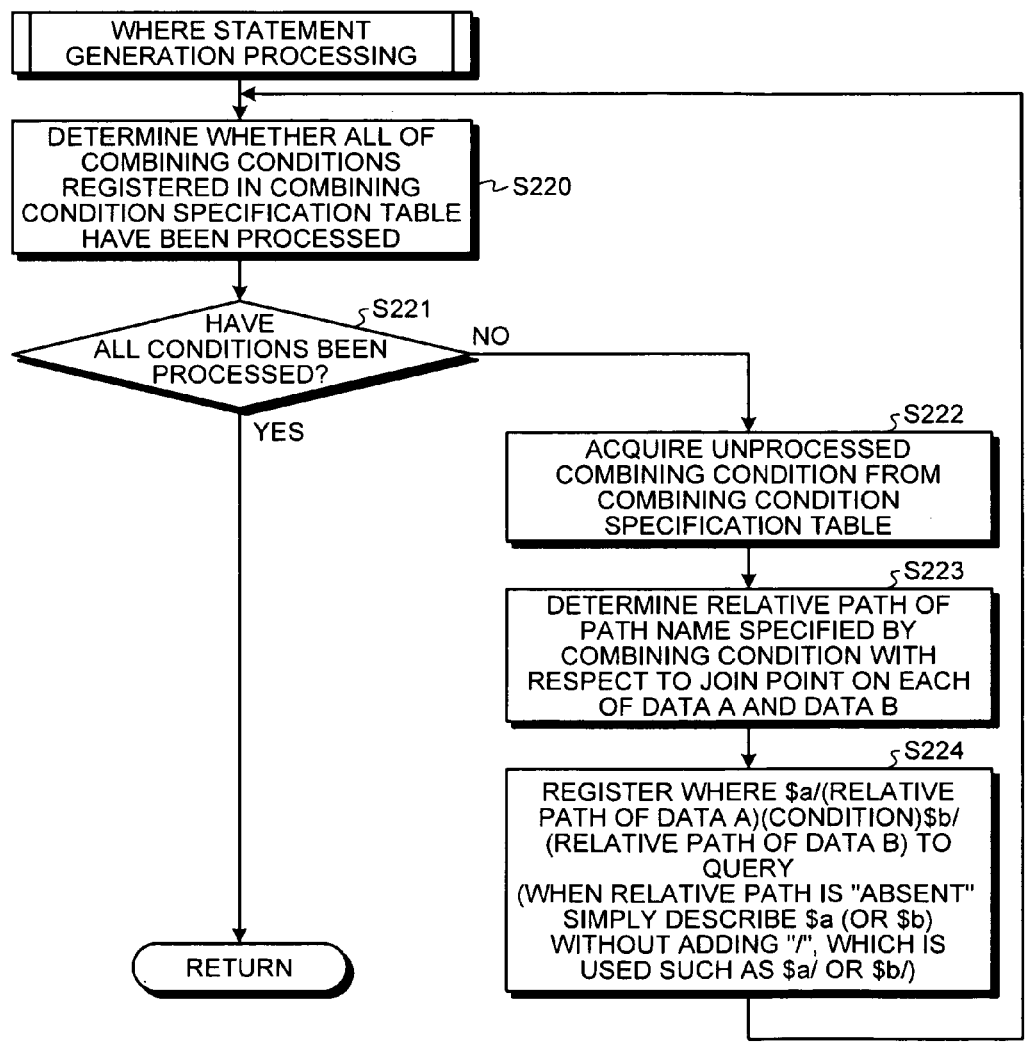
FIG. 50 is a flowchart illustrating a processing procedure of processing to generate a Where statement.

The processing to generate a Where statement illustrated at step S201 of FIG. 48 is described below. FIG. 50 is a flowchart illustrating a processing procedure of the processing to generate a Where statement. As illustrated in FIG. 50, the query generation unit 150f determines whether all of the combining conditions registered in the combining condition specification table 140d have been processed (step S220).

If all of the combining conditions registered in the combining condition specification table 140d have been processed (YES at step S221), the query generation unit 150f completes the processing to generates Where statements. On the other hand, if all of the combining conditions registered in the combining condition specification table 140d have not been processed (NO at step S221), the query generation unit 150f acquires an unprocessed combining condition from the combining condition specification table 140d (step S222).

The query generation unit 150f determines a relative path of the path name specified by the combining condition with respect to the Join point on each of the data A and the data B (step S223), and registers Where $a/(the relative path of the data A)(the condition)$b/(the relative path of the data B) to the query 140f (step S224). When the relative path is "absent", the query generation unit 150f simply describes $a (or $b) without adding "/", which is used such as $a/ or $b/.

Figure 51:
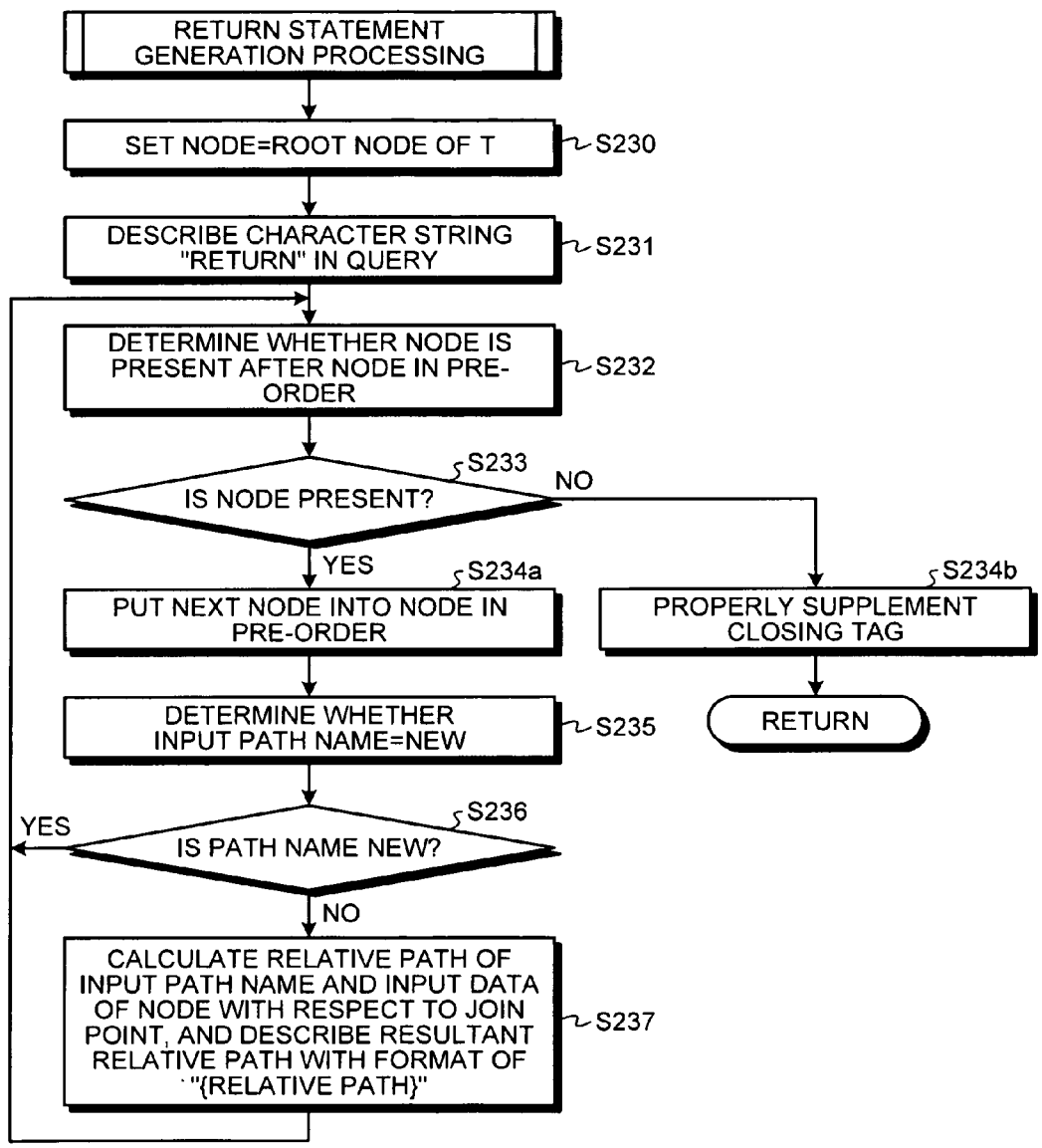
FIG. 51 is a flowchart illustrating a processing procedure of processing to generate a Return statement.

The processing to generate a Return statement illustrated at step S202 of FIG. 48 is described below. FIG. 51 is a flowchart illustrating a processing procedure of the processing to generate a Return statement. As illustrated in FIG. 51, the query generation unit 150f sets Node=the root node of T (step S230), and describes a character string "Return" in the query (step S231).

The query generation unit 150f determines whether a node is present after the Node in pre-order (step S232). If the next node is absent (NO at step S233), the query generation unit 150f properly supplements a closing tag (step S234b), and completes the processing to generate the Return statement.

On the other hand, if the next tag is present (YES at step S233), the query generation unit 150f puts the next node into the Node in pre-order (step S234a), and determines whether the input path name=New (step S235).

If the input path name=New (YES at step S236), the query generation unit 150f moves to step S232. On the other hand, if the input path name≠New (NO at step S236), the query generation unit 150f calculates a relative path of the input path name and the input data of the Node with respect to the Join point, and describes the resultant relative path with the format of "{relative path}" in the query (step S237), and moves to step S232.

As described above, in the search device 100 according to the embodiment, the path trie generation unit 150a generates the input path trie 140b, the path trie display unit 150c outputs the input path trie 140b to the output unit 120, so that user specifies Join points and combining conditions. The instruction reception unit 150d generates a query serving as command statements to combine each piece of XML data based on the combining conditions and the Join points that are specified by the user. Consequently, the user can easily combine XML data without inputting complicated command statements by user oneself.

Further, in the search device 100 according to the embodiment, the increase determination unit 150e determines reference Join points, and notifies a user of an indication of an increase amount of combined data generated based on the Join points specified by the user on the basis of the reference Join points and the join points specified by the user. Consequently, a data amount of the combined data can be prevented from being increased beyond necessity.

In the embodiment, XML data is described as a semi-structured data, and the query is described by using the XPath expressions. However, types of semi-structured data and query are not limited to those. For example, the semi-structured data includes an RDB table and CSV data as well as the XML data. Therefore, the present invention can be applied to the RDB table and the CSV data.

In the processes described in the embodiment, all or a part of the processes described to be automatically performed can also be manually performed. Alternatively, all or a part of the processes described to be manually performed can also be automatically performed by known methods. In addition, the processing procedures, control procedures, the specific names, and information including various data and parameters described in the above text and drawings can be arbitrarily modified, unless otherwise specified. For example, the condition of the combining condition specification table 140*d* illustrated in FIG. 23 is not limited to the full coincidence. For example, the condition may be changed to partial coincidence.

Further, the components of the devices illustrated in the drawings are functionally conceptual, and are not always applied to be physically configured as illustrated in the drawings. That is, specific forms of distributions and integrations of the devices are not limited to those illustrated in the drawings. All or part of the devices can be configured to be functionally or physically distributed or integrated in arbitrary units in accordance with various loads, the usage states, and the like. Further, all or part of the processing functions performed by the devices may be realized by a CPU and a program analyzed and executed by the CPU, or may be realized by hardware based on wired logic.

Figure 52:
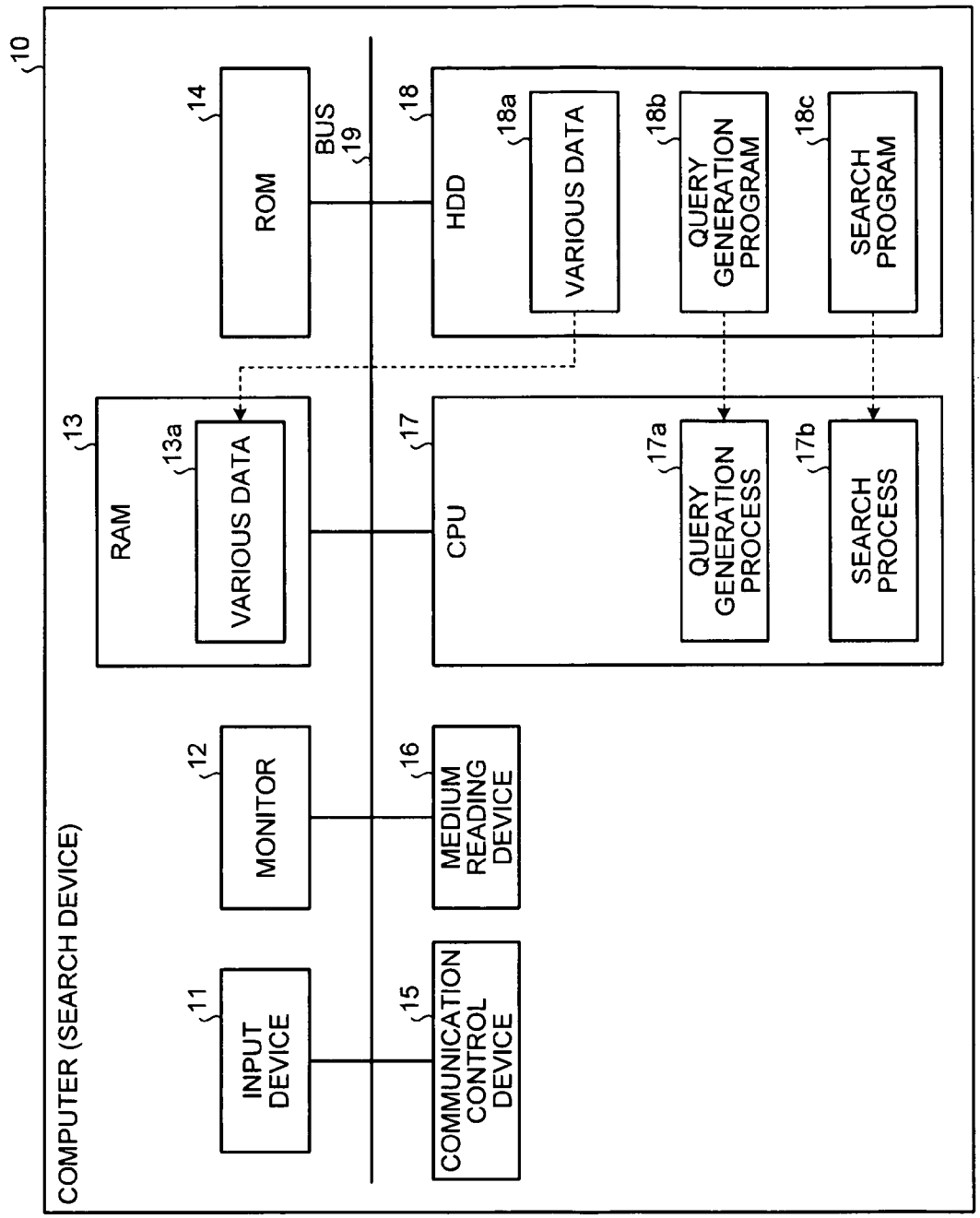
FIG. 52 is a schematic illustrating a hardware configuration of a computer corresponding to the search device described in the embodiment.

FIG. 52 is a schematic illustrating a hardware configuration of a computer corresponding to the search device 100 described in the embodiment. As illustrated in FIG. 52, in a computer (search device) 10, an input device 11, a monitor 12, a RAM (Random Access Memory) 13, a ROM (Read Only Memory) 14, a communication control device 15 that performs data communication with other devices through a network, a medium reading device 16, a CPU (Central Processing Unit) 17, and an HDD (Hard Disk Drive) 18 are coupled with a bus 19.

The HDD 18 stores a query generation program 18*b* and a search program 18*c* that exert functions similar to the functions of the above-described search device 100. The CPU 17 reads and executes the query generation program 18*b* and the search program 18*c*, so that a query generation process 17*a* and a search process 17*b* are activated.

Herein, the query generation process 17*a* corresponds to the path trie generation unit 150*a*, the sibling occurrence number counting unit 150*b*, the path trie display unit 150*c*, the instruction reception unit 150*d*, the increase determination unit 150*e*, the query generation unit 150*f*, and the combination processing unit 150*g* illustrated in FIG. 15. The search process 17*b* corresponds to the search processing unit 150*h*.

The HDD 18 stores various data 18*a* corresponding to the data stored in the storage unit 140 illustrated in FIG. 15. The CPU 17 loads the various data 18*a* stored in the HDD 18 into the RAM 13, and utilizes various data 13*a*. The CPU 17 generates a query when receiving join points and combining conditions from a user through the input device 11.

Execution of a computer program stored in a storage medium allows a user to easily perform data combination of the XML data with a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium recording a computer program, when executed by a computer including a storage unit storing therein a plurality of pieces of tree structure data having hierarchized elements, causing the computer to perform a process comprising:
generating a plurality of pieces of first aggregate structure data each aggregating relationships among elements of the tree structure data by aggregating a plurality of child elements to a single child element when the tree structure data includes the plurality of child elements that have a same name and are directly associated with a same parent element;
receiving second aggregate structure data corresponding to combined data generated by combining parts of each piece of the tree structure data, a combining condition for each element of the tree structure data to be combined, and one of the elements of the first aggregate structure data as a specified element specifying a data handling unit of the tree structure data;
first determining one of the elements of the first aggregate structure data as a reference element based on the second aggregate structure data corresponding to the combined data and the combining condition, the reference element being a reference of a data handling unit of the tree structure data;
second determining to what extent a second data amount of combined data generated based on the specified element as a data handling unit of the tree structure data increases as compared with a first data amount of combined data generated based on the reference element as a data handling unit of the tree structure data; and
outputting a determined result.

2. The non-transitory computer-readable storage medium according to claim 1, wherein the generating further includes recording an aggregation number of aggregated elements so as to correspond to the first aggregate structure data when aggregating a plurality of child elements that have a same name and are directly associated with a same parent element, and the second determining determines an increase of the second data amount as compared with the first data amount based on the aggregation number corresponding to descendant elements of the specified element, the descendant elements being associated with the reference element.

3. The non-transitory computer-readable storage medium according to claim 1, wherein the first determining further includes extracting, for each element that is specified as an output element of the second aggregate structure data corresponding to the combined data and is received at the receiving, hierarchic information indicating a hierarchic relationship from an uppermost hierarchy element to the element in the first aggregate structure data corresponding to the tree structure data including the element, and further extracting, for each element that is specified by the combining condition and received at the receiving, hierarchic information indicating a hierarchic relationship from an uppermost hierarchy element to the element in the first aggregate structure data corresponding to the tree structure data including the element, and determining a lowest hierarchic element in common hierarchic information in the extracted hierarchic information as the reference element for each piece of the first aggregate structure data corresponding to the tree structure data to be combined.

4. The non-transitory computer-readable storage medium according to claim 1, wherein the second determining further includes, for each piece of the first aggregate structure data, identifying the aggregation number corresponding to descendant elements of the specified element, the descendant elements being associated with the reference element, and determining an increase of the second data amount as compared with the first data amount by multiplying each aggregation number by each other.

5. A database search method performed by a search device including a storage unit storing therein a plurality of pieces of tree structure data having hierarchized elements, the method comprising:

generating a plurality of pieces of first aggregate structure data each aggregating relationships among elements of the tree structure data by aggregating a plurality of child elements to a single child element when the tree structure data includes the plurality of child elements that have a same name and are directly associated with a same parent element;

receiving second aggregate structure data corresponding to combined data generated by combining parts of each piece of the tree structure data, a combining condition for each element of the tree structure data to be combined, and one of the elements of the first aggregate structure data as a specified element specifying a data handling unit of the tree structure data;

first determining one of the elements of the first aggregate structure data as a reference element based on the second aggregate structure data corresponding to the combined data and the combining condition, the reference element being a reference of a data handling unit of the tree structure data;

second determining to what extent a second data amount of combined data generated based on the specified element as a data handling unit of the tree structure data increases as compared with a first data amount of combined data generated based on the reference element as a data handling unit of the tree structure data; and outputting a determined result.

6. The database search method according to claim 5, wherein the generating further includes recording an aggregation number of aggregated elements so as to correspond to the first aggregate structure data when aggregating a plurality of child elements that have a same name and are directly associated with a same parent element, and the second determining determines an increase of the second data amount as compared with the first data amount based on the aggregation number corresponding to descendant elements of the specified element, the descendant elements being associated with the reference element.

7. The database search method according to claim 5, wherein the first determining further includes extracting, from each element that is specified as an output element of the second aggregate structure data corresponding to the combined data and received at the receiving, hierarchic information indicating a hierarchic relationship from an uppermost hierarchy element to the element in the first aggregate structure data corresponding to the tree structure data including the element, and further extracting, for each element that is specified by the combining condition and received at the receiving, hierarchic information indicating a hierarchic relationship from an uppermost hierarchy element to the element in the first aggregate structure data corresponding to the tree structure data including the element, and determining a lowest hierarchic element in common hierarchic information in the extracted hierarchic information as the reference element for each piece of the first aggregate structure data corresponding to the tree structure data to be combined.

8. The database search method according to claim 5, wherein the second determining further includes, for each piece of the first aggregate structure data, identifying the aggregation number corresponding to descendant elements of the specified element, the descendant elements being associated with the reference element, and determining an increase of the second data amount as compared with the first data amount by multiplying each aggregation number by each other.

9. A storage search device, comprising:

a processor; and a memory wherein the processor executes generating a plurality of pieces of first aggregate structure data each aggregating relationships among elements of a tree structure data by aggregating a plurality of child elements to a single child element when the tree structure data includes the plurality of child elements that have a same name and are directly associated with a same parent element;

receiving second aggregate structure data corresponding to combined data generated by combining parts of each piece of the tree structure data, a combining condition for each element of the tree structure data to be combined, and one of the elements of the first aggregate structure data as a specified element specifying a data handling unit of the tree structure data;

first determining one of the elements of the first aggregate structure data as a reference element based on the second aggregate structure data corresponding to the combined data and the combining condition, the reference element being a reference of a data handling unit of the tree structure data;

second determining to what extent a second data amount of combined data generated based on the specified element as a data handling unit of the tree structure data increases as compared with a first data amount of combined data generated based on the reference element as a data handling unit of the tree structure data; and outputting a determined result.

10. The storage search device according to claim 9, wherein the generating further includes recording an aggregation number of aggregated elements so as to correspond to the first aggregate structure data when aggregating a plurality of child elements that have a same name and are directly associated with a same parent element, and the second determining determines an increase of the second data amount as compared with the first data amount based on the aggregation number corresponding to descendant elements of the specified element, the descendant elements being associated with the reference element.

11. The storage search device according to claim 9, wherein the first determining further includes extracting, from each element that is specified as an output element of the second aggregate structure data corresponding to the combined data and received at the receiving, hierarchic information indicating a hierarchic relationship from an uppermost hierarchy element to the element in the first aggregate structure data corresponding to the tree structure data including the element, and further extracting, for each element that is specified by the combining condition and received at the receiving, hierarchic information indicating a hierarchic relationship from an uppermost hierarchy element to the element in the first aggregate structure data corresponding to the tree structure data including the element, and determining a lowest hierarchic element in common hierarchic information in the extracted hierarchic information as the reference element for each piece of the first aggregate structure data corresponding to the tree structure data to be combined.

12. The storage search device according to claim 9, wherein the second determining further includes, for each piece of the first aggregate structure data, identifying the aggregation number corresponding to descendant elements of the specified element, the descendant elements being associated with the reference element, and determining an increase of the second data amount as compared with the first data amount by multiplying each aggregation number by each other.

* * * * *